(12) United States Patent
Lee et al.

(10) Patent No.: US 11,664,691 B2
(45) Date of Patent: May 30, 2023

(54) ELECTRIC PUMP AND MOTOR

(71) Applicant: LG INNOTEK CO., LTD., Seoul (KR)

(72) Inventors: Byung Sam Lee, Seoul (KR); Sang Tae Kim, Seoul (KR); Su Won Kim, Seoul (KR); Hyun Kag Park, Seoul (KR); Jong Chan Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/495,172

(22) Filed: Oct. 6, 2021

(65) Prior Publication Data

US 2022/0077734 A1    Mar. 10, 2022

Related U.S. Application Data

(63) Continuation of application No. 16/643,670, filed as application No. PCT/KR2018/009004 on Aug. 8, 2018, now Pat. No. 11,303,169.

(30) Foreign Application Priority Data

Sep. 13, 2017   (KR) .................. 10-2017-0117159
Sep. 14, 2017   (KR) .................. 10-2017-0117930
(Continued)

(51) Int. Cl.
*H02K 1/27*      (2022.01)
*H02K 1/276*     (2022.01)
(Continued)

(52) U.S. Cl.
CPC ............ *H02K 1/276* (2013.01); *H02K 1/278* (2013.01); *H02K 5/12* (2013.01); *F04C 2/102* (2013.01);
(Continued)

(58) Field of Classification Search
CPC .......... H02K 1/276; H02K 1/278; H02K 5/12; H02K 21/14; H02K 2201/06;
(Continued)

(56) References Cited

U.S. PATENT DOCUMENTS

| | | | |
|---|---|---|---|
| 2012/0070321 A1 | 3/2012 | Cho et al. | |
| 2012/0070322 A1* | 3/2012 | Cho | H02K 21/14 |
| | | | 417/410.1 |
| 2015/0139831 A1 | 5/2015 | Yoon | |
| 2015/0240813 A1 | 8/2015 | Yoon | |
| 2017/0085142 A1* | 3/2017 | Murota | H02K 1/2766 |

FOREIGN PATENT DOCUMENTS

| | | |
|---|---|---|
| EP | 2 916 006 | 9/2015 |
| JP | 2003-227474 A | 8/2003 |

(Continued)

OTHER PUBLICATIONS

Korean Office Action dated Mar. 12, 2022 issued in KR Application No. 10-2017-0117930.

(Continued)

*Primary Examiner* — Thomas Truong
(74) *Attorney, Agent, or Firm* — KED & Associates LLP

(57) ABSTRACT

The present invention provides A motor comprising: a shaft; a rotor including a hole in which the shaft is disposed; and a stator outside the rotor, wherein the rotor comprises a rotor core and a magnet, wherein the rotor core comprises: a main body; a pocket which is formed in the main body and in which the magnet is disposed; first barriers extending from both sides of the pocket; and second barriers formed between an inner circumferential surface of the main body and an outer circumferential surface of the main body, wherein a center (C11) of the second barrier has a certain arrangement angle (θ) in a circumferential direction from a (Continued)

first line (L11) passing through a center (CC) of the main body and a center of a width (W) of the magnet.

11 Claims, 23 Drawing Sheets

(30) Foreign Application Priority Data

Sep. 15, 2017 (KR) ........................ 10-2017-0118455
Sep. 15, 2017 (KR) ........................ 10-2017-0118456

(51) Int. Cl.
*H02K 1/278* (2022.01)
*H02K 5/12* (2006.01)
*F04C 2/10* (2006.01)
*H02K 21/14* (2006.01)

(52) U.S. Cl.
CPC ...... *F04C 2240/30* (2013.01); *F04C 2240/40* (2013.01); *H02K 21/14* (2013.01); *H02K 2201/06* (2013.01)

(58) Field of Classification Search
CPC ................. H02K 2213/03; F04C 2/102; F04C 2240/30; F04C 2240/40; F04C 15/06; F16H 57/04; F16H 57/0436; B60T 17/02; B60T 13/74

See application file for complete search history.

(56) References Cited

FOREIGN PATENT DOCUMENTS

| JP | 2012-097586 A | 5/2012 |
| JP | 6172381 | 8/2017 |
| KR | 10-2012-0030929 | 3/2012 |
| KR | 10-2015-0081784 | 7/2015 |
| KR | 10-2015-0098909 | 8/2015 |
| KR | 10-2015-0112245 | 10/2015 |
| KR | 10-2016-0114879 | 10/2016 |
| KR | 10-2017-0045663 | 4/2017 |

OTHER PUBLICATIONS

European Search Report dated May 13, 2020 issued in Application No. 18857018.8.
International Search Report dated Nov. 29, 2018 issued in Application No. PCT/KR2018/009004.
U.S. Election/Restriction Requirement dated Aug. 19, 2021 issued in U.S. Appl. No. 16/643,670.
Japanese Office Action dated Jun. 21, 2022 issued in Application 2020-510554.

* cited by examiner

[FIG. 1]
1
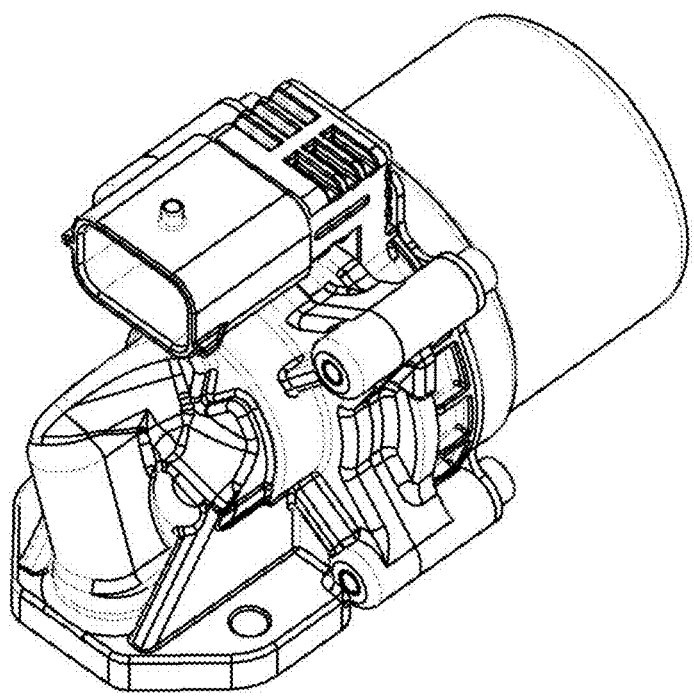

[FIG. 2]
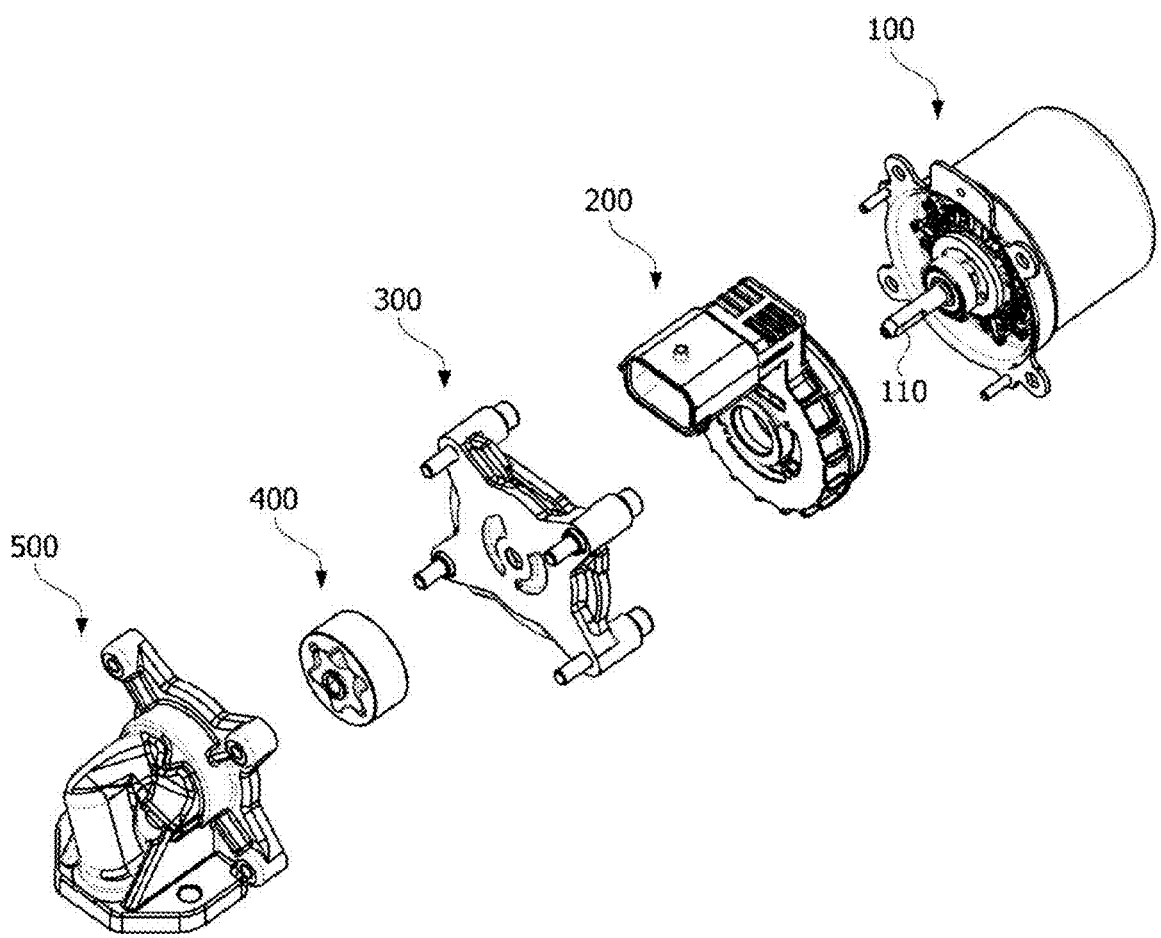

[FIG. 3]
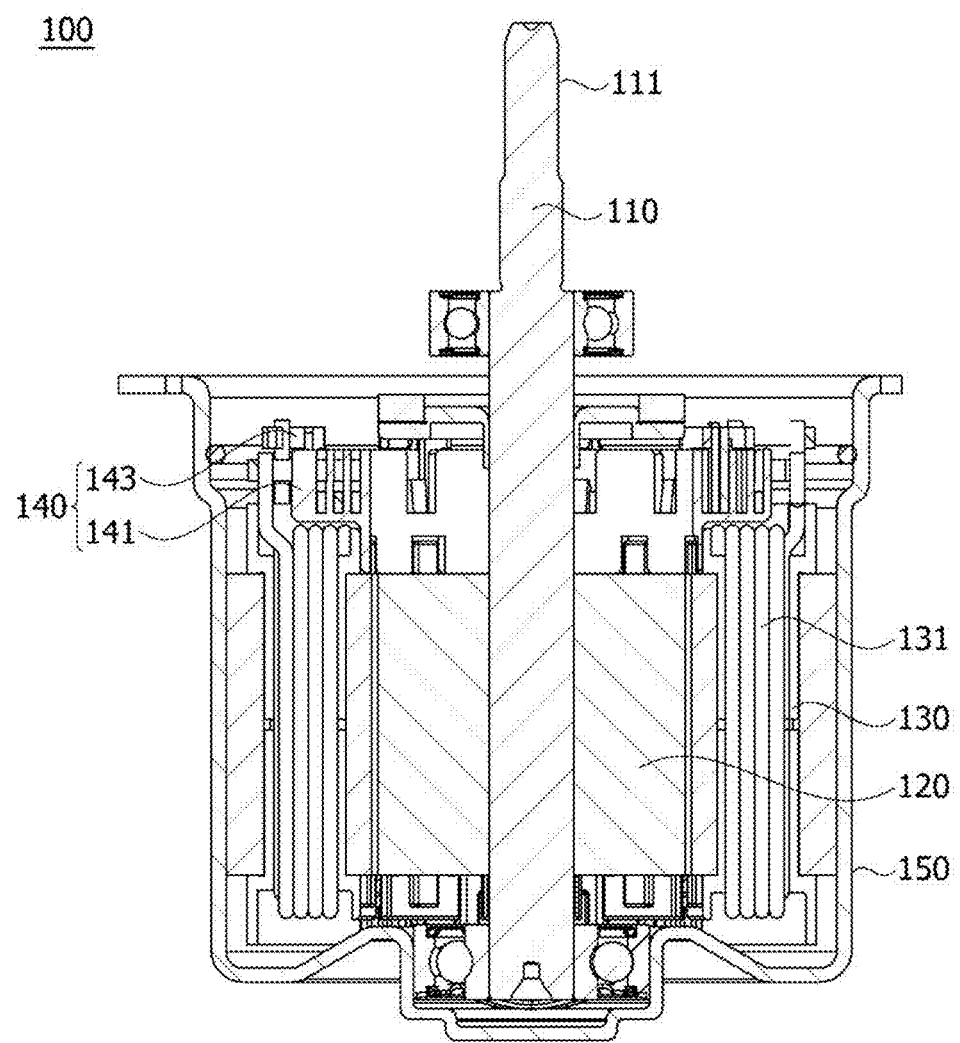

[FIG. 4]
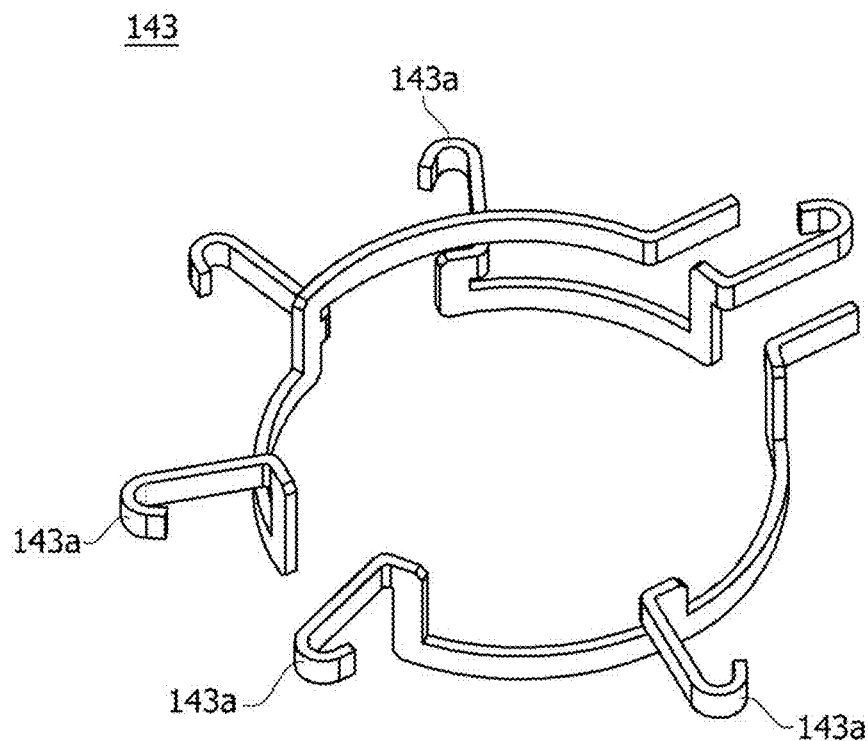
[FIG. 5]
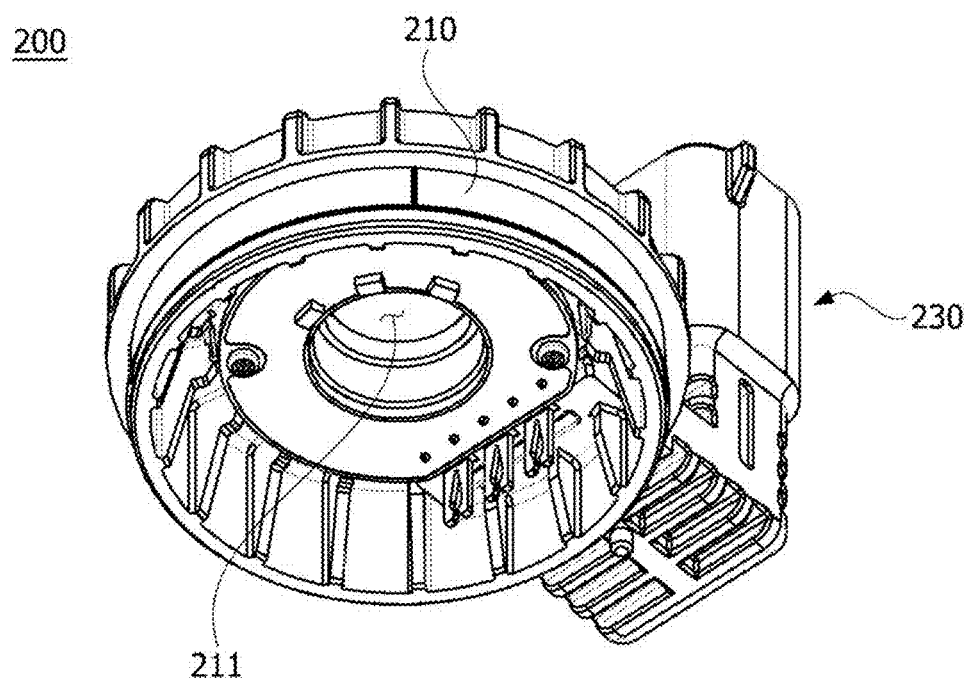

[FIG. 6]
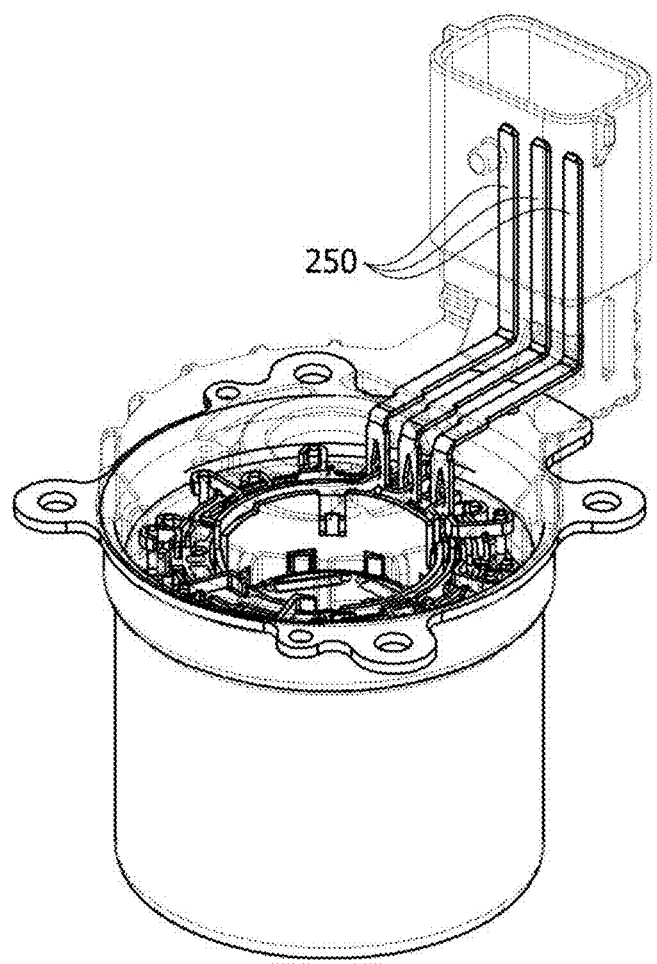

[FIG. 7]
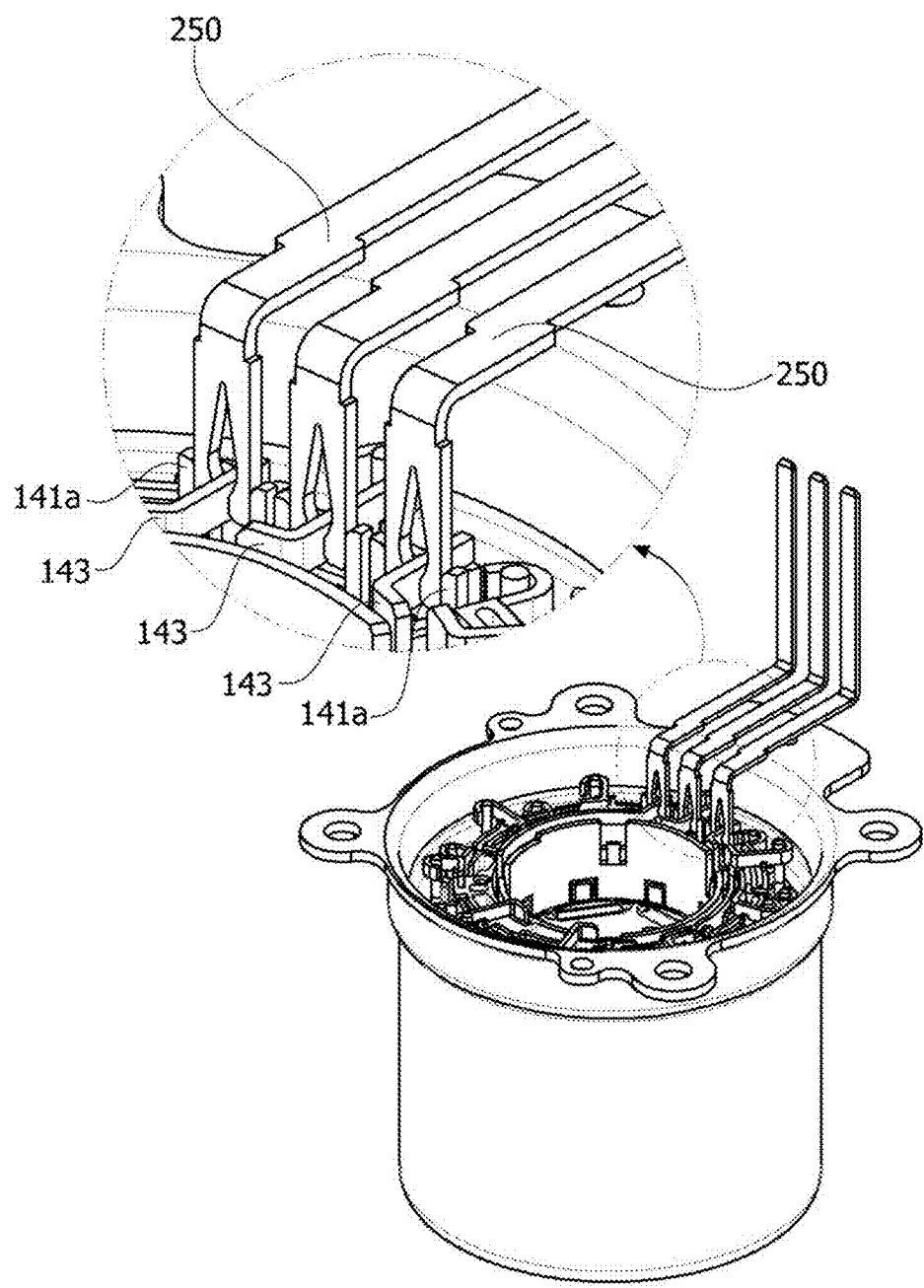

[FIG. 8]
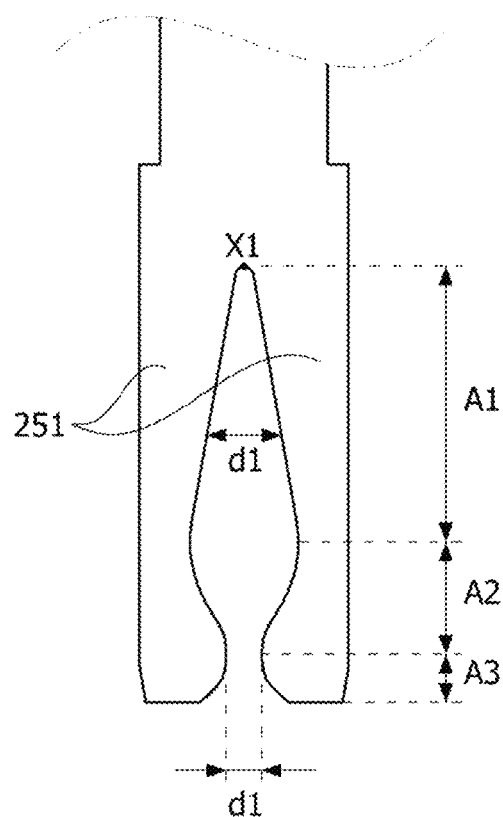

[FIG. 9]
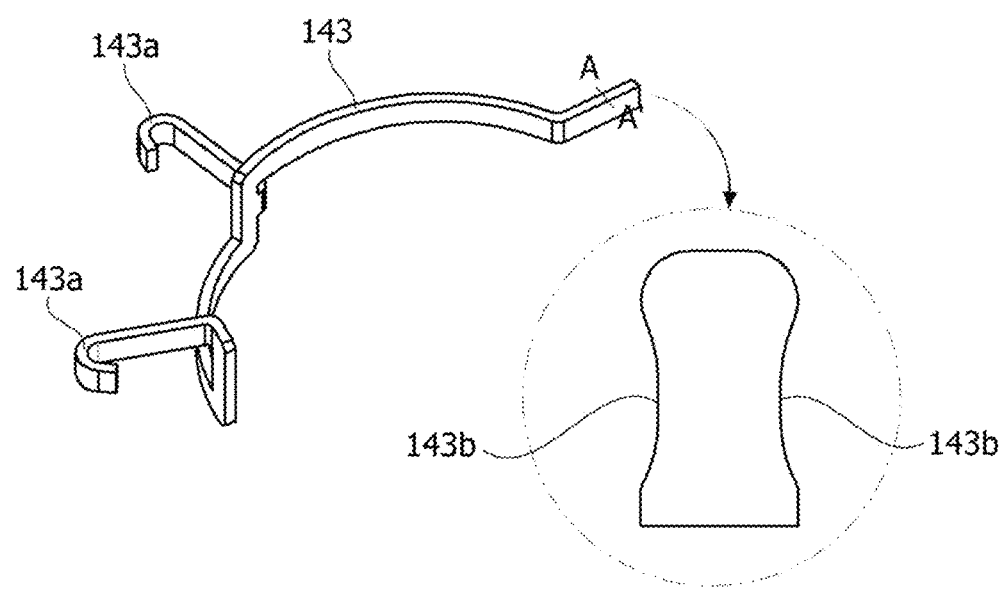

[FIG. 10]
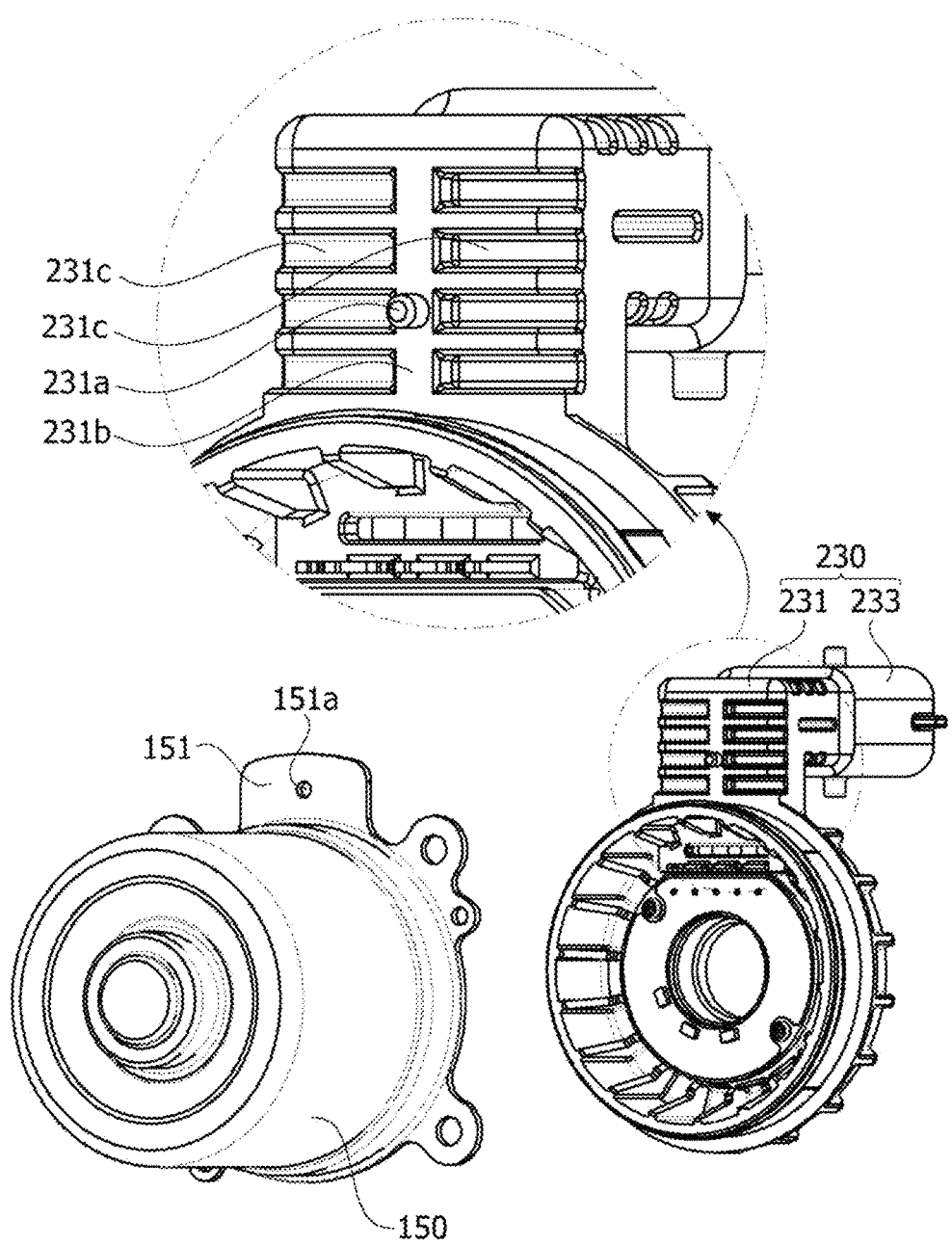

[FIG. 11]
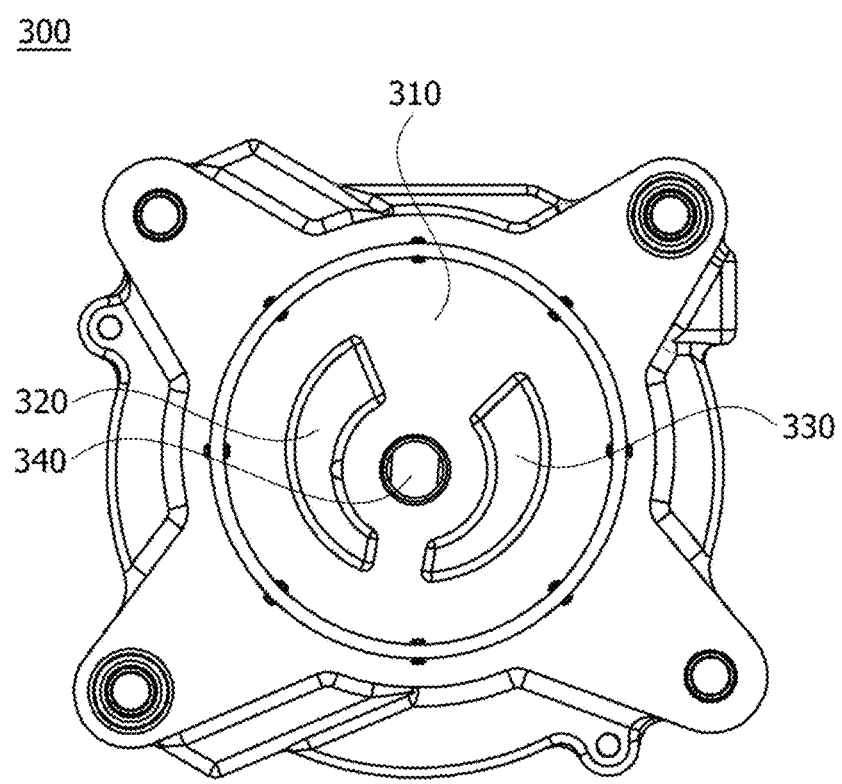

[FIG. 12]
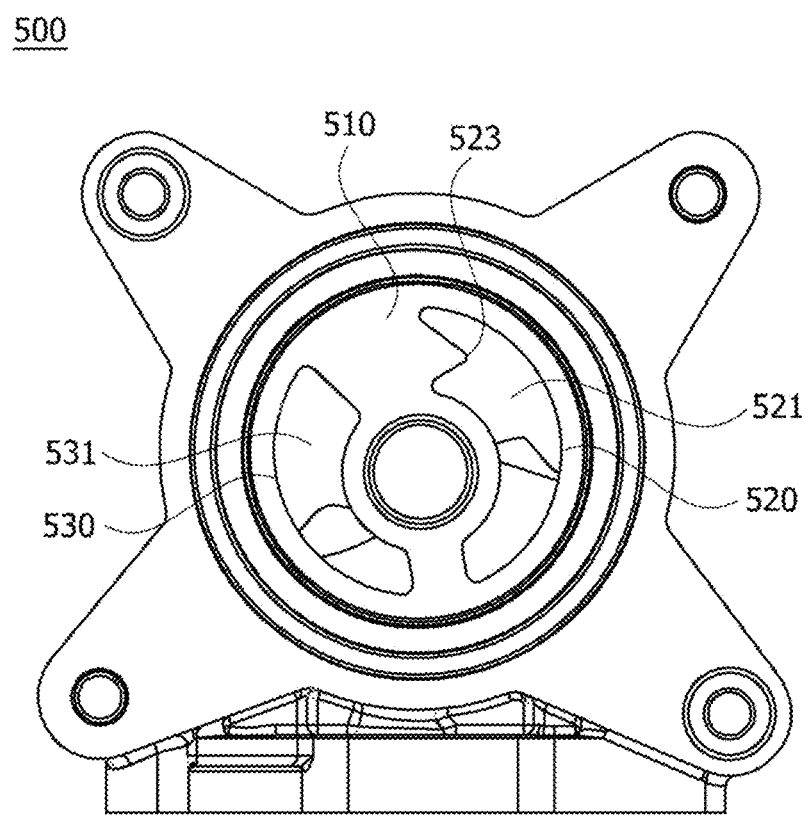

[FIG. 13]
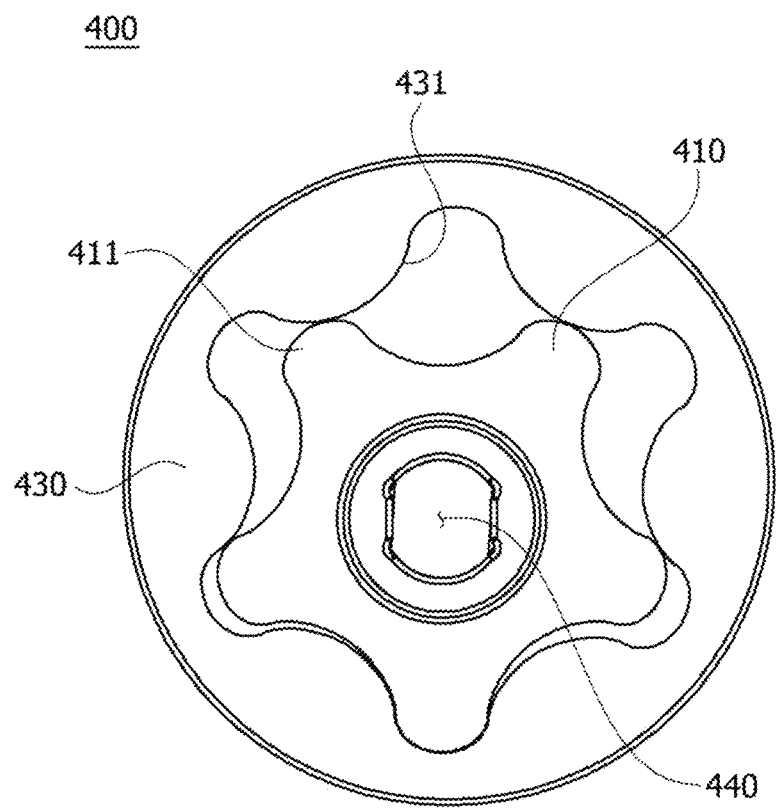

[FIG. 14]
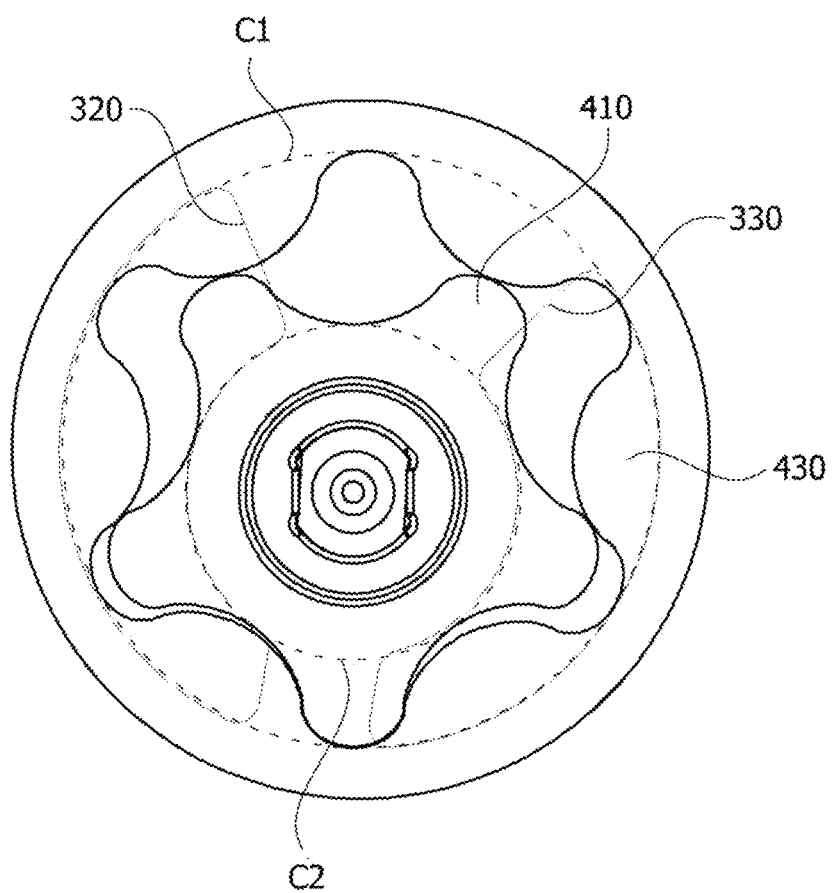

[FIG. 15]
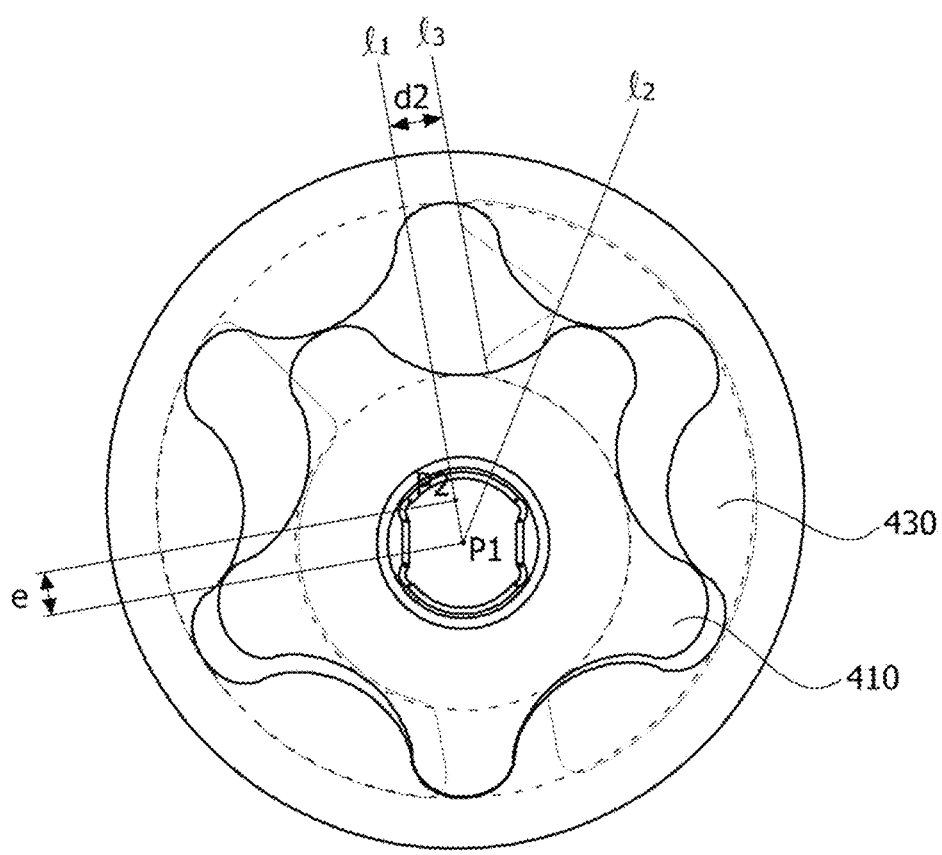

[FIG. 16]
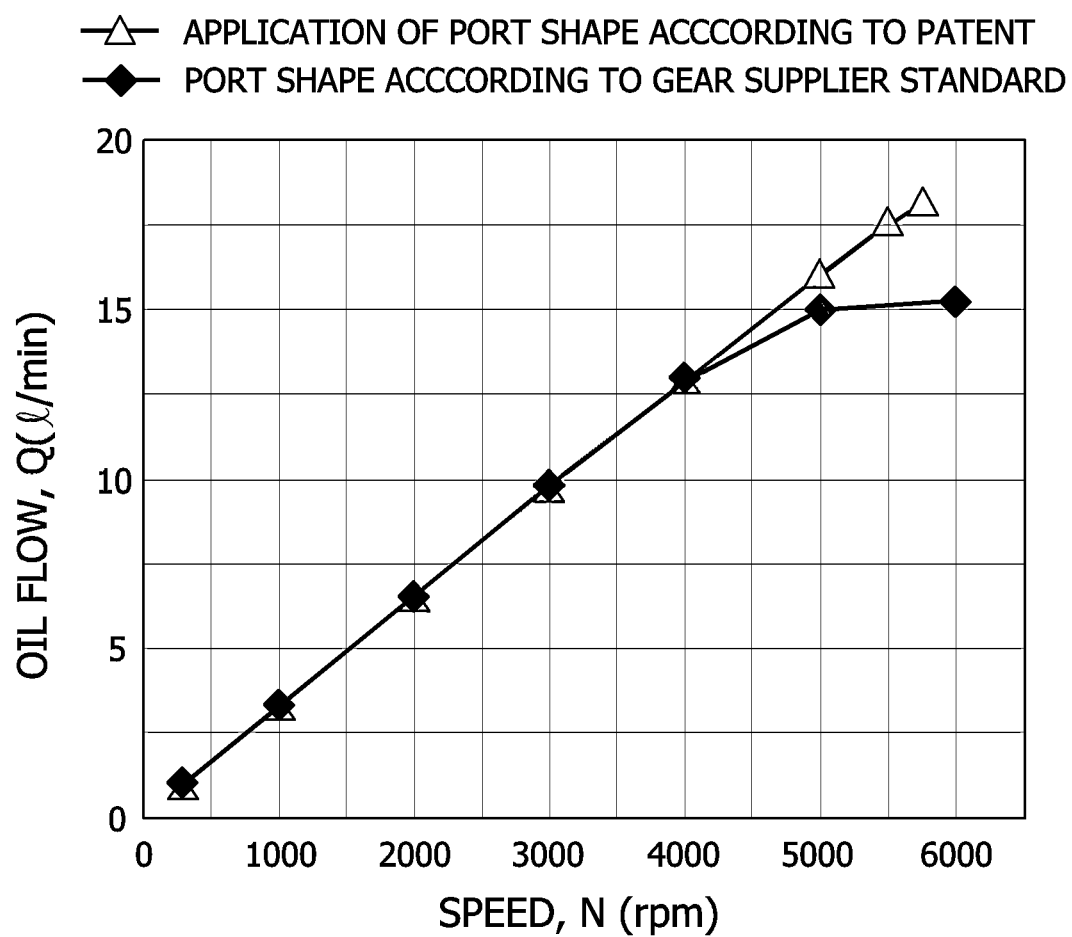

[FIG. 17]
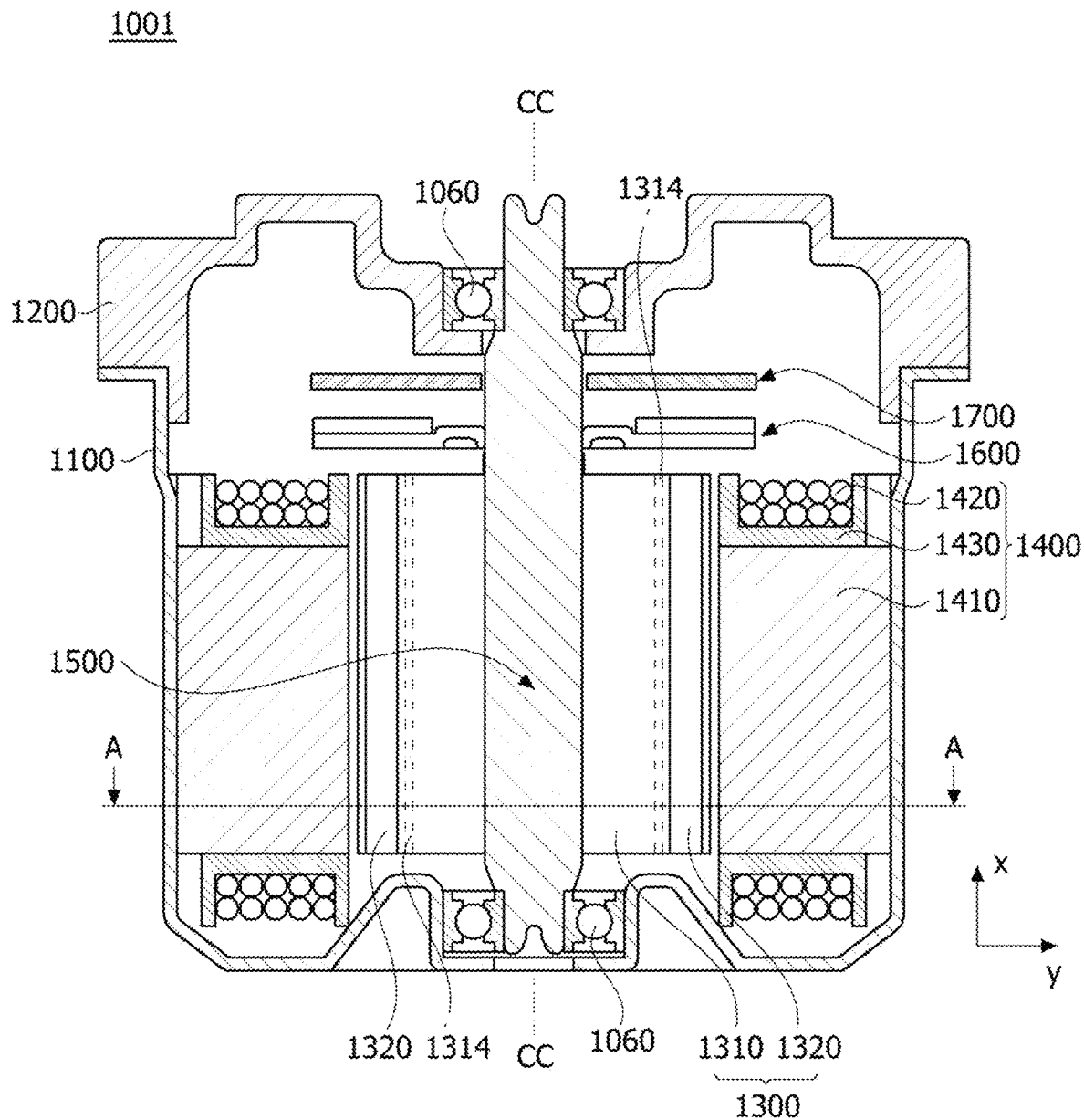

[FIG. 18]
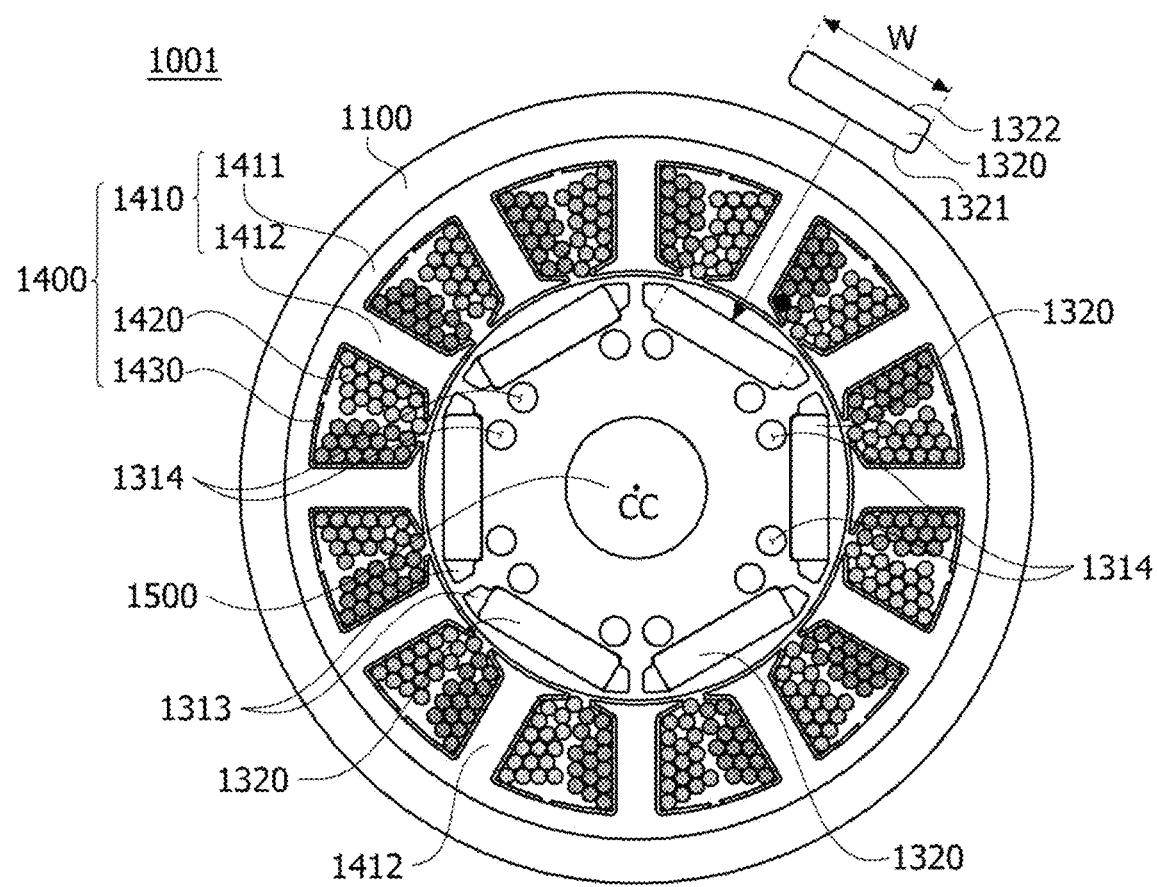

[FIG. 19]
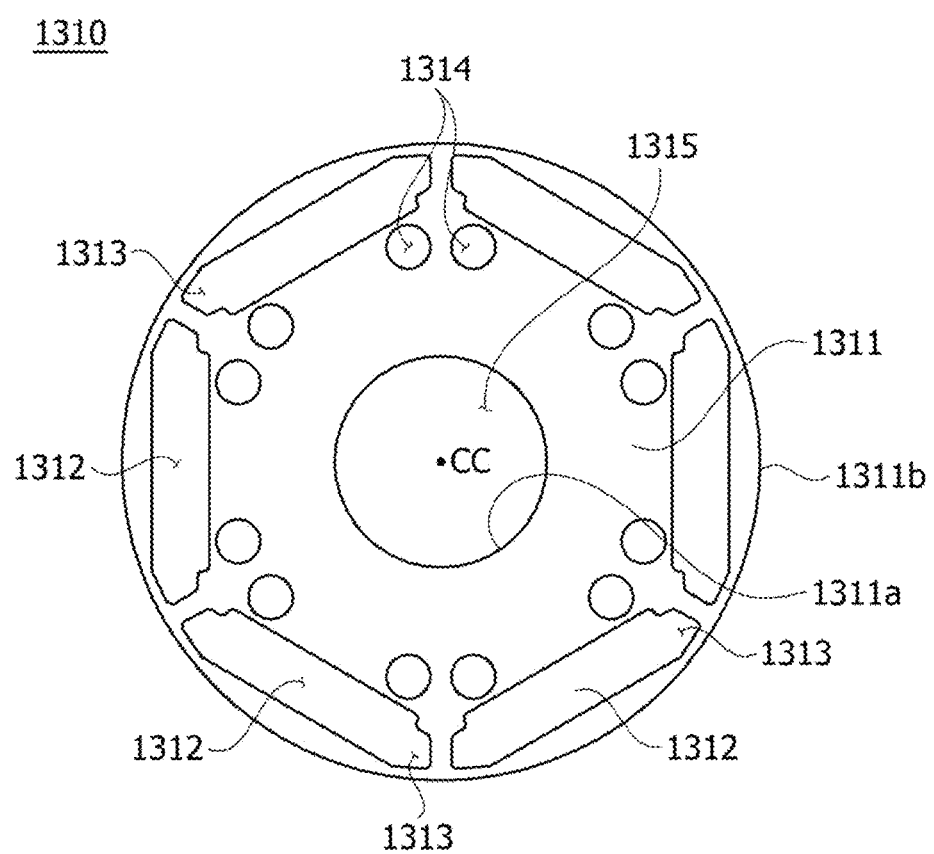

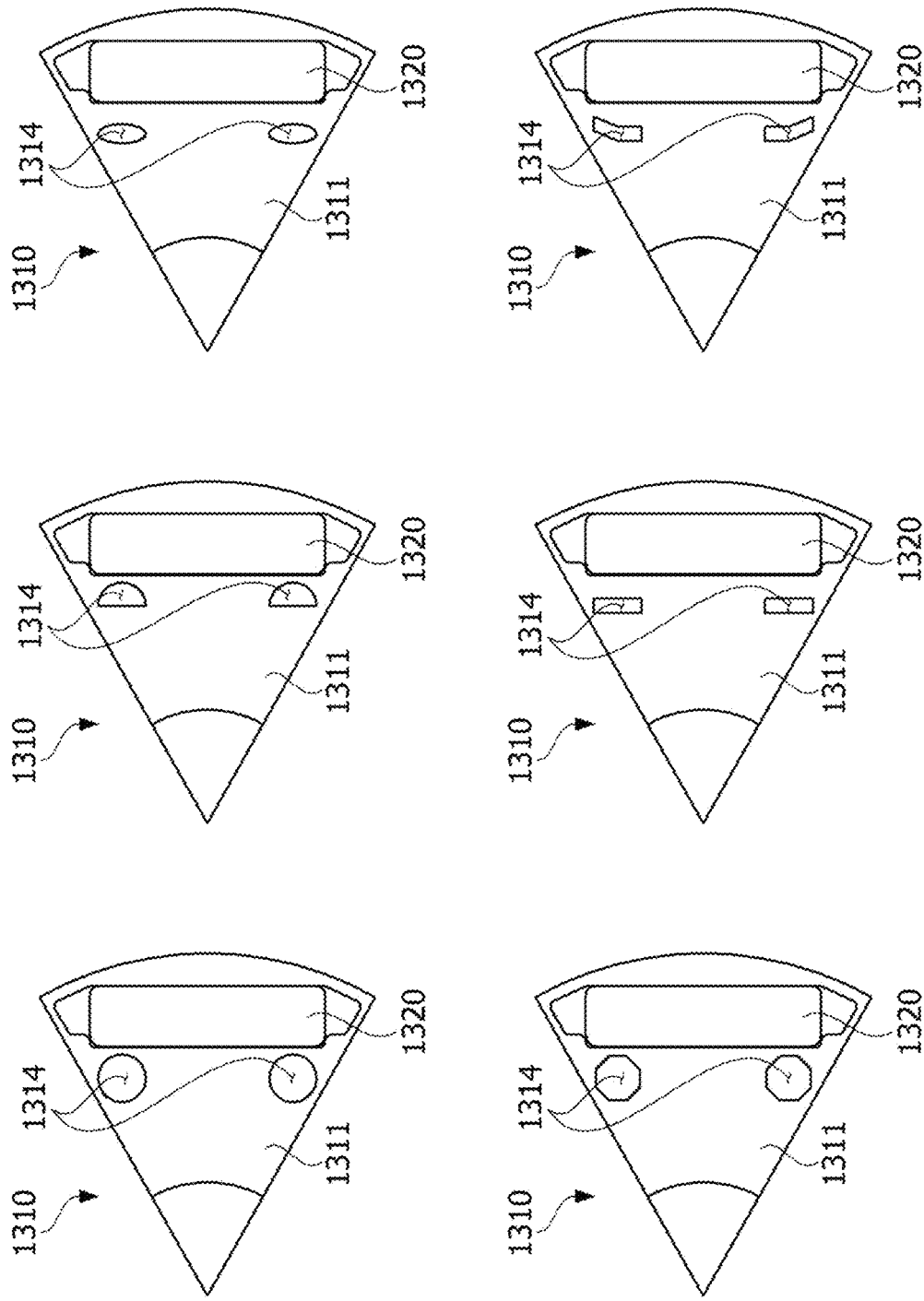
[FIG. 21]

[FIG. 22A]
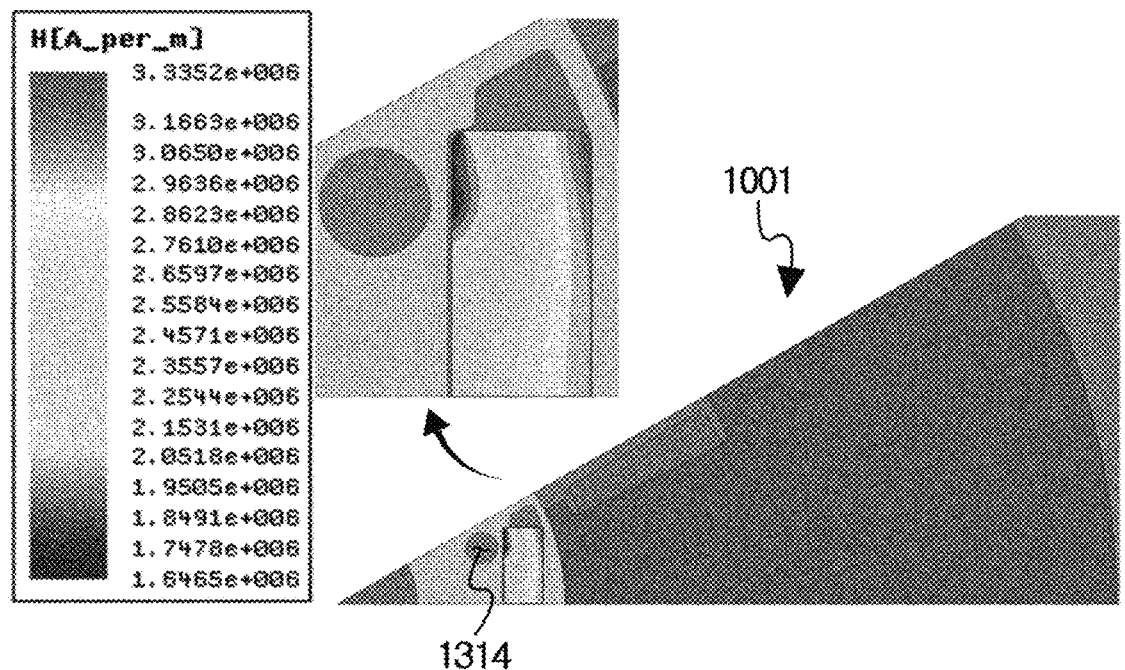
[FIG. 22B]
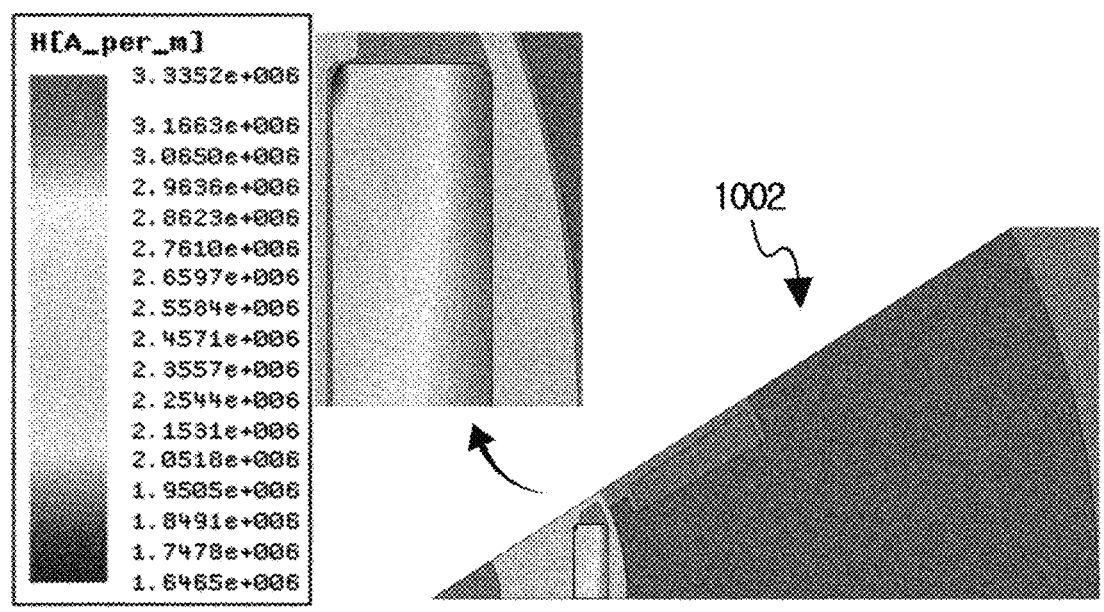

[FIG. 23A]
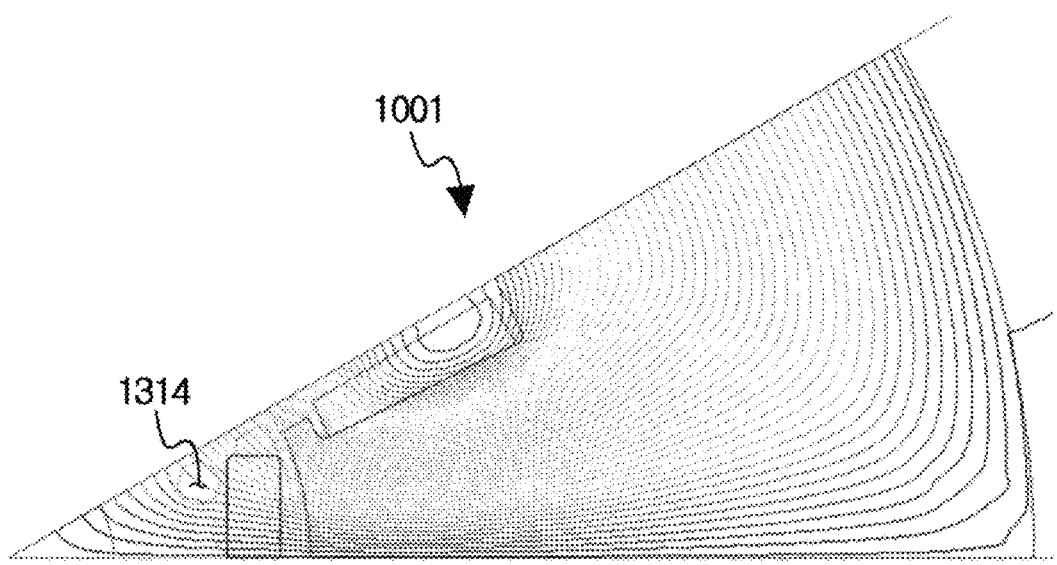
[FIG. 23B]
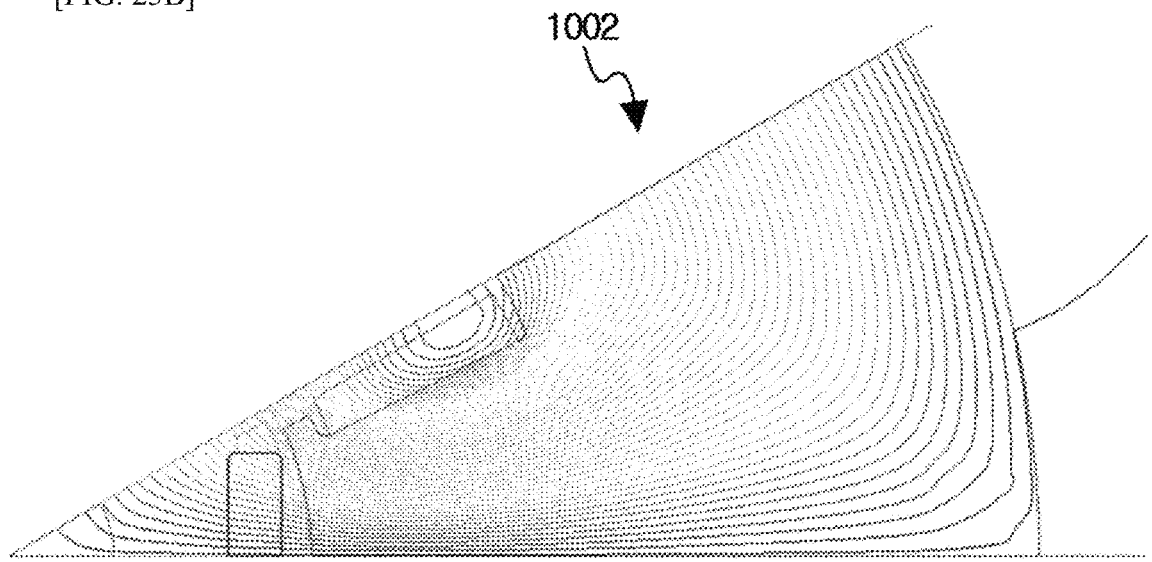

[FIG. 24A]
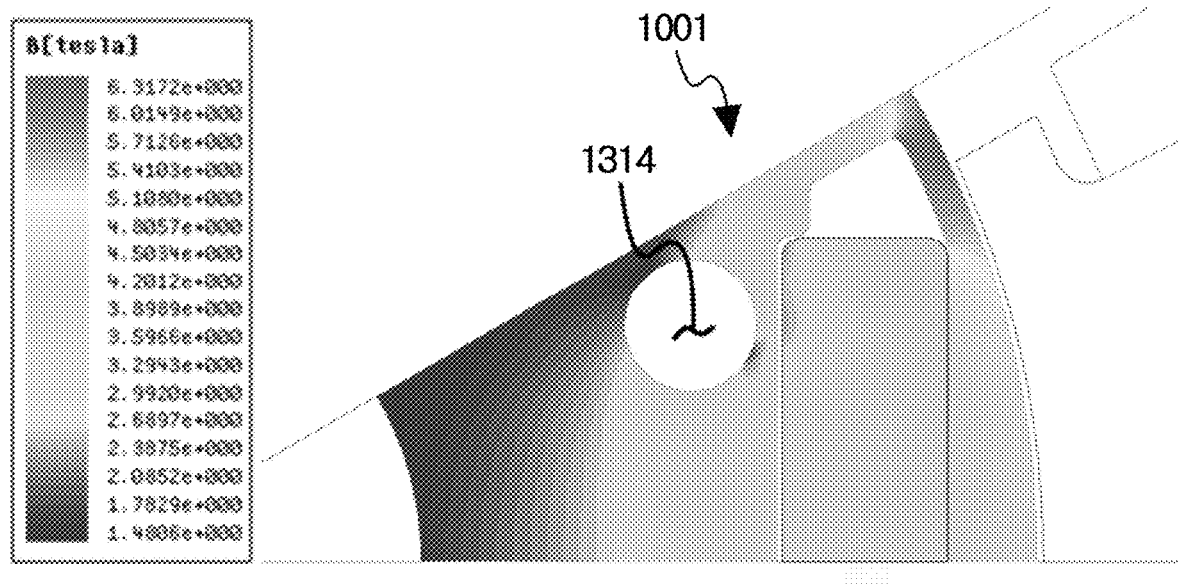
[FIG. 24B]
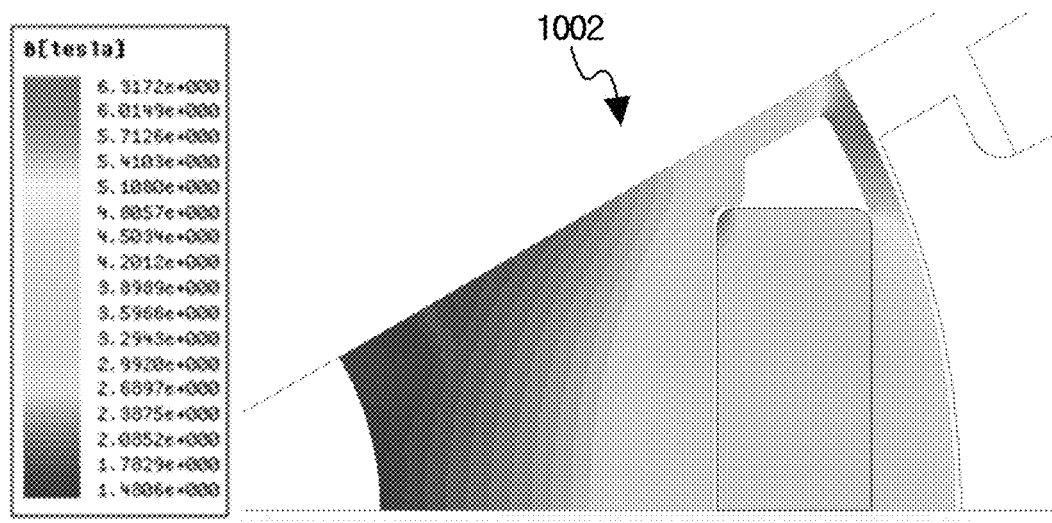

ELECTRIC PUMP AND MOTOR

CROSS-REFERENCE TO RELATED PATENT APPLICATIONS

This application is a Continuation of U.S. application Ser. No. 16/643,670, filed Mar. 2, 2020, which is a U.S. National Stage Application under 35 U.S.C. § 371 of PCT Application No. PCT/KR2018/009004, filed Aug. 8, 2018, which claims priority to Korean Patent Application Nos. 10-2017-0117159, filed Sep. 13, 2017, 10-2017-0117930, filed Sep. 14, 2017, 10-2017-0118455, filed Sep. 15, 2017 and 10-2017-0118456, filed Sep. 15, 2017, whose entire disclosures are hereby incorporated by reference.

TECHNICAL FIELD

Embodiments relate to an electric pump and a motor.

BACKGROUND ART

In general, an electric oil pump (EOP) is a device that supplies oil to a hydraulic line of a transmission or a braking device of a vehicle using a motor, in which circulation of oil is necessary.

In the case of a hybrid electric vehicle (HEV), an engine is stopped when the vehicle is stopped and thus it is difficult to supply a constant pressure to a transmission through a mechanical oil pump. Therefore, the HEV employs an electric oil pump that supplies oil through a motor.

Such an electric oil pump includes a suction port and a discharge port through which oil moves.

However, in an electric oil pump of the related art, a phenomenon occurs in which flow rate performance decreases sharply at a high flow rate and a flow rate is not uniform during the movement of a fluid.

A motor is a device that converts electrical energy into mechanical energy to generate a turning force and has been widely used in vehicles, household appliances, industrial equipment, and the like.

The motor may include a housing, a shaft, a stator disposed on an inner circumferential surface of the housing, a rotor installed on an outer circumferential surface of the shaft, and the like. Here, the stator of the motor causes electrical interaction with the rotor to induce rotation of the rotor.

Here, the rotor may be classified into a surface-mounted permanent magnet (SPM) type and an interior permanent magnet (IPM) type according to a coupling structure of a magnet installed in the rotor core.

In an IPM type rotor, a magnet is inserted into a rotor core and thus magnetic flux density is lower than that of an SPM type rotor in which a magnet is exposed on a surface thereof, and therefore, dynamic characteristics of a motor having the IPM type rotor may be lower than those of a motor having the SPM type rotor.

In particular, when barriers are formed at both sides of the magnet in the IPM type rotor, an H-field indicating the magnitude of a magnetic flux is low at inner corners of the magnet. Accordingly, when a magnetization process is performed after assembly of the magnet, HS characteristics indicating the strength of a magnetic force may not be satisfied and thus full magnetization cannot be achieved. In addition, when the motor is operated at a high temperature, a risk of irreversible demagnetization may occur additionally.

When the H-field is increased to satisfy the HS characteristics of the magnet so as to solve the above problems, an overcurrent may be supplied and thus a magnetizer and a magnetization yoke may be degraded.

Therefore, there is a need for a rotor which achieves full saturated magnetization of a magnet only with a certain amount of current without applying an overcurrent.

DISCLOSURE

Technical Problem

Embodiments are directed to providing an electric pump in which a shape of a suction port is changed to stabilize a flow of a fluid.

Embodiments are also directed to providing an electric pump capable of being detachably coupled with a bus bar through a fork-type terminal.

Embodiments are also directed to providing an electric pump in which a motor housing and a connector unit are connectable at accurate positions.

Other embodiments of the present invention are directed to providing a motor in which barriers are formed on a rotor core to achieve full magnetization of a magnet.

Other embodiments are directed to providing a motor in which an arrangement position of a barrier is determined by an arrangement angle and distance relative to a central point.

Aspects of the present invention are not limited thereto and other aspects not mentioned herein will be clearly understood by those of ordinary skill in the art from the following description.

Technical Solution

According to one aspect of the present invention, an electric pump includes a motor unit which includes a shaft, a rotor coupled to the shaft, and a stator disposed outside the rotor; a pump unit which includes a first rotor coupled to the motor unit and including a first lobe having gear teeth, and a second rotor disposed outside the first rotor and including a second lobe; and a second cover including a second surface on which the pump unit is disposed, wherein a second suction port and a second discharge port are disposed on the second surface, the second suction port provided on the second surface includes a third protrusion protruding toward an inner side of the second suction port, and an angle formed by a first line connecting the center of the first rotor and the center of the second rotor and a second line connecting the center of the first rotor and a distal end of the third protrusion is inversely proportional to the number of gear teeth of the first lobe.

The first line passing through the center of the first rotor and the center of the second rotor may be parallel to a third line connecting ends of the second suction port in a region adjacent to the third protrusion.

A distance between the first line and the second line may be proportional to a distance between the center of the first rotor and the center of the second rotor.

A first cover may be disposed between the motor unit and the pump unit, the first cover may include a first surface which accommodates the pump unit, the first surface may include a first suction port and a first discharge port, and the first suction port and the second suction port may have different shapes.

The second cover may include an inlet which communicates with the second suction port and an outlet which communicates with the second discharge port.

A third coupling hole may be formed in the center of the first rotor and engaged with the shaft, the shaft may have at least one cut surface, and the cut surface may match in shape with the third coupling hole.

According to another aspect of the present invention, an electric pump includes a motor unit including a shaft, a rotor provided with the shaft, a stator disposed outside the rotor, a bus bar disposed above the stator, and a motor housing which accommodates the rotor and the stator; and a connector unit disposed on the motor unit and including a power terminal coupled to a terminal of the bus bar, wherein the bus bar includes a bus bar terminal coupled with a coil wound around the stator or the rotor, and a bus bar body which insulates the bus bar terminal, an end of the power terminal diverges into a pair of contact portions, and the bus bar terminal is inserted between the contact portions to be electrically connected to the contact portions.

Divergence areas of the pair of contact portions may include a curved surface.

Each of the pair of contact portions may include a first region, a width of which increases at the divergence area; a second region which extends from the first region and a width of which decreases; and a third region which extends from the second region and a width of which increases, wherein a point at which the second region and the third region are connected to each other is in contact with the bus bar body.

The third region may include a curved surface.

The bus bar body may include a pair of first protrusions which guide the pair of contact portions.

The bus bar terminal may include a curved portion and be in surface contact with the pair of contact portions.

According to another aspect of the present invention, an electric pump includes a motor unit including a shaft, a rotor coupled to the shaft, a stator disposed outside the rotor, and a motor housing which accommodates the rotor and the stator; and a connector unit disposed on the motor unit, wherein the motor unit includes at least one hole, and the connector unit includes at least one second protrusion inserted into the at least one hole.

An end portion of the motor housing may include a protrusion having a certain area, the connector unit may include a connector body and a connector connection part facing the protrusion, the protrusion may be provided with the at least one hole, and the connector connection part may be provided with the at least one second protrusion inserted into the at least one hole.

The connector connection part may be connected to a side of the connector body and include a first connection portion on which the at least one second protrusion is disposed and a second connection portion connected at a certain angle to the first connection portion.

The connector connection part may include a plurality of grooves arranged such that opposite sides thereof are symmetric to each other, and the at least one second protrusion may be provided between the plurality of grooves.

The connector connection part may include a rib formed in a lengthwise direction, and the at least one second protrusion may be provided on the rib.

The at least one second protrusion may be provided in a cylindrical shape, and an upper end thereof may be inclined along a circumference of the at least one second protrusion.

According to another aspect of the present invention, a motor includes a shaft, a rotor including a hole in which the shaft is disposed, and a stator outside the rotor, wherein the rotor includes a rotor core and a magnet, the rotor core includes a main body, a pocket which is formed in the main body and in which the magnet is disposed, first barriers extending from both sides of the pocket, and second barriers formed between an inner circumferential surface of the main body and an outer circumferential surface of the main body, and a center (C11) of the second barrier has a certain arrangement angle θ in a circumferential direction from a first line (L11) passing through a center (CC) of the main body and a center of a width (W) of the magnet.

The arrangement angle θ may be calculated by the following equation:

$$\arctan\left(\frac{W/2}{D11}\right) \le \theta \le \arctan\left(\frac{W/2}{D22}\right),$$

wherein W represents a width of the magnet, D11 represents a distance from the center of the main body to an inner side surface of the magnet, and D22 represents a distance from the center of the main body to an outer side surface of the magnet.

The second barrier may have a certain radius (R).

The inner side surface of the magnet may be disposed on a second line (L22) passing through the center (CC) of the main body and the center (C11) of the second barrier.

An arrangement distance D33 from the center (CC) of the main body to the center (C11) of the second barrier may be calculated by the following equation:

$$D33 = \frac{D11}{\cos\theta} - O - R,$$

wherein O represents a distance between one point (P1) on an outer circumferential surface of the second barrier disposed on the second line (L22) and one point P2 on the inner side surface of the magnet.

The second barrier may be formed to be long from an upper end of the main body to a lower end of the main body.

Two of the second barriers disposed to correspond to one magnet may be symmetrical to each other with respect to the first line (L11).

Advantageous Effects

According to an embodiment, flow rate performance can be achieved even at a high flow rate.

Noise can be reduced by stabilizing the flow of a fluid.

Durability of a product can be increased by minimizing bubbles to be introduced into a region in which a fluid flows.

An additional process or structure for connecting a terminal and a bus bar of a motor can be skipped to reduce an assembly time and costs.

Components are replaceable by applying a detachable structure.

The reliability of assembly of a terminal and a bus bar may be secured using a position guide.

A connector unit can be connected at a designated position, thereby minimizing performance deviation for each product.

A manufacturing method can be simplified and process investment costs can be reduced by simplifying a shape of a motor housing for fixing a position.

In addition, in a motor according to another embodiment of the present invention, a second barrier can be formed in a rotor to adjust magnetic flux saturation of a rotor core during magnetization of a magnet. Accordingly, when the same current is supplied for magnetization, full magnetization of the magnet can be achieved by allowing a maximum H field in a region of the magnet.

In this case, an arrangement position of the second barrier on the rotor core can be adjusted by an arrangement angle and distance.

Various and beneficial advantages and effects of the present invention are not limited to the above description and will be more easily understood in the course of describing specific embodiments of the present invention.

DESCRIPTION OF DRAWINGS

FIG. 1 is a perspective view of an electric pump according to an embodiment of the present invention.

FIG. 2 is an exploded perspective view of FIG. 1,

FIG. 3 is a diagram illustrating a structure of a motor unit which is a component of FIG. 1, FIG. 4 is a diagram illustrating a structure of a bus bar which is a component of FIG. 1, FIG. 5 is a diagram illustrating a structure of a connector unit which is a component of FIG. 1, FIG. 6 is a diagram illustrating an arrangement of power terminals included in the connector unit which is a component of FIG. 1, FIG. 7 is a diagram illustrating a structure in which the bus bar and the power terminals of FIG. 1 are connected to each other, FIG. 8 is a diagram illustrating a structure of an end portion of the power terminal of FIG. 7, FIG. 9 illustrates a bus bar terminal which is coupled to the power terminal in FIG. 7 according to an embodiment, FIG. 10 is a diagram illustrating a structure in which a motor housing and a connector unit of FIG. 2 are connected to each other, FIG. 11 is a diagram illustrating a first suction port and a first discharge port formed in a first cover of FIG. 2, FIG. 12 is a diagram illustrating a second suction port and a second discharge port formed in a second cover of FIG. 2, FIG. 13 is a diagram illustrating a structure of a pump unit in FIG. 2, FIG. 14 is a diagram illustrating a state in which the pump unit is located on the first cover, FIG. 15 is a diagram illustrating a state in which the pump unit is located on the second cover, FIG. 16 is a diagram showing a change in flow rate performance when a shape of the second cover of FIG. 15 is applied, FIG. 17 is a longitudinal sectional view of a motor according to the embodiment, FIG. 18 is a cross-sectional view taken along line A-A of FIG. 17, FIG. 19 is a diagram illustrating a rotor core of a motor according to an embodiment, FIG. 21 is a diagram illustrating various embodiments of a second barrier of a rotor disposed in a motor according to an embodiment, FIG. 22A and FIG. 22B are diagrams showing a comparison of an H field of a rotor of a motor according to an embodiment with an H field of a rotor of a motor according to a comparative example, FIG. 23A and FIG. 23B are diagrams showing a comparison of a uniform magnetic flux line of a rotor of a motor according to an example with a uniform magnetic flux line of a rotor of a motor according to a comparative example, FIG. 24A and FIG. 24B are diagrams showing a comparison of magnetic flux density of a rotor of a motor according to an example with magnetic flux density of a rotor of a motor according to a comparative example.

MODES OF THE INVENTION

Figure 20:
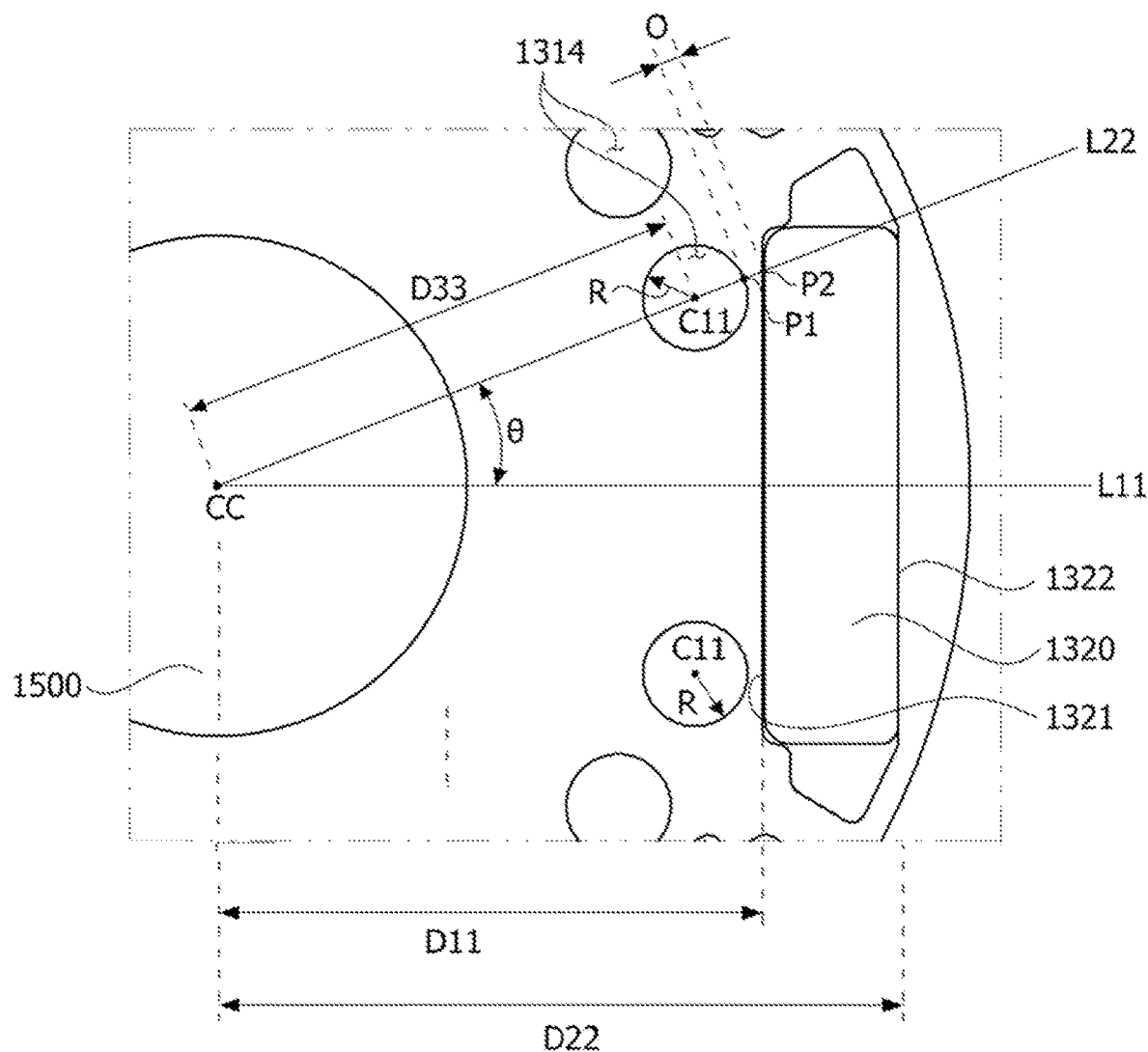
FIG. 20 is a diagram illustrating region B of FIG. 18.

Various changes may be made in the present invention and various embodiments may be implemented, and certain embodiments will be illustrated in the drawings and described hereinafter. However, it should be understood that embodiments of the present invention are not limited to these embodiments and cover all modifications, equivalents, and alternatives falling within the idea and scope of embodiments.

As used herein, the terms "first," "second," etc. may be used herein to describe various elements but these elements are not limited by these terms. These terms are used only for the purpose of distinguishing one element from another. For example, a second element discussed below could be termed a first element without departing from the scope of embodiments. Similarly, a first element could be termed a second element. The terms "and/or" includes any one or any combination of a plurality of related listed items.

The terminology used herein is for the purpose of describing certain embodiments only and is not intended to be limiting of embodiments of the present invention. As used herein, the singular expressions are intended to include plural forms as well, unless the context clearly dictates otherwise. It will understood that the terms "comprise" and/or "comprising," when used herein, specify the presence of stated features, integers, steps, operations, elements, components, or a combination thereof but do not preclude the presence or addition of one or more features, integers, steps, operations, elements, components, or a combination thereof.

When one element is referred to as being formed "on" or "under" another element in embodiments, it will be understood that the two elements are formed to be in direct contact with each other or to be in indirect contact with each other while one or more elements are interposed therebetween. The expression "on or under one element" should be understood to mean not only an upward direction but also a downward direction with respect to the element.

Hereinafter, embodiments will be described in detail with reference to the accompanying drawings, and the same or corresponding components will be denoted by the same reference numerals regardless of figure number and will not be redundantly described.

FIGS. 1 to 16 clearly illustrate only main features for conceptually clear understanding of the present invention, and thus, it is expected that various modifications may be made in the drawings and the scope of the present invention should not be limited by specific shapes shown in the drawings.

FIG. 1 is a perspective view of an electric pump according to an embodiment of the present invention. FIG. 2 is an exploded perspective view of FIG. 1.

Referring to FIGS. 1 and 2, the electric pump according to the embodiment of the present invention may include a motor unit 100, a connector unit 200, a first cover 300, a pump unit 400, and a second cover 500.

The motor unit 100 generates power to transfer the power to the electric pump, and the connector unit 200 is provided on the motor unit 100 to supply the power to the motor unit 100.

The connector unit 200 is provided on the motor unit 100 and may include a connector body 210 on a motor housing 150 and a connector connection part 230 connected to a side of the connector body 210. A first through hole 211 may be provided, through which a shaft 110 of the motor unit 100 passes.

The first cover 300 is disposed between the connector unit 200 and the pump unit 400 and includes a second through hole 340 through which the shaft 110 of the motor unit 100 passes.

The pump unit 400 may be disposed between the first cover 300 and the second cover 500 and may be provided with a third through hole to which the shaft 110 passing through the first cover 300 is coupled.

The second cover 500 may be disposed on a front side of the pump unit 400 and combined with the first cover 300 to accommodate the pump unit 400.

FIG. 3 is a diagram illustrating a structure of the motor unit 100 of FIG. 1.

Referring to FIG. 3, the motor unit 100 transmits power to the pump unit 400 and includes the shaft 110, a rotor 120, a stator 130, a bus bar 140, and a motor housing 150.

The shaft 110 may be coupled to the rotor 120. When power is supplied to cause electromagnetic interaction between the rotor 120 and the stator 130, the rotor 120 rotates and the shaft 110 rotates in connection therewith. The shaft 110 may be supported by a bearing.

The rotor 120 is disposed inside the stator 130. The rotor 120 may include a rotor core and a magnet coupled to the rotor core. The rotor 120 may be classified into the following types according to a coupling method of the rotor core and the magnet.

The rotor 120 may be embodied as a type in which the magnet is coupled to an outer circumferential surface of the rotor core. In this type of the rotor 120, a separate can member may be coupled to the rotor core to prevent separation of the magnet and increase the coupling of the magnet. Alternatively, the magnet and the rotor core may be double injected and integrally formed.

The rotor 120 may embodied as a type in which the magnet is coupled to the inside of the rotor core. In this type of the rotor 120, the inside of the rotor core may be provided with a pocket into which the magnet is inserted.

There may be two types of rotor core.

First, a rotor core may be formed by stacking a plurality of thin steel plates together. In this case, the rotor core may be formed as one piece that does not form a skew angle or as a form in which a plurality of unit cores forming a skew angle are combined together.

Secondly, a rotor core may be in the form of a single container. In this case, the rotor core may be formed as one piece that does not form a skew angle or as a form in which a plurality of unit cores forming a skew angle are combined together.

A magnet may be included inside or outside each of the unit cores.

The stator 130 causes electrical interaction with the rotor 120 to induce the rotation of the rotor 120. A coil 131 may be wound around the stator 130 to cause interaction with the rotor 120. A specific configuration of the stator 130 for winding a coil around the stator 30 will be described below.

The stator 130 may include a stator core with teeth. The stator core may be provided with a ring-shaped yoke and teeth may be provided on the yoke to face the center of the stator core. The teeth may be provided around the yoke at regular intervals. The stator core may be formed by stacking a plurality of thin steel plates together. Alternatively, the stator core may be formed by coupling or connecting a plurality of divided cores to each other.

The bus bar 140 may be disposed on an upper end of the stator 130 to be electrically connected to the coil 131. The bus bar 140 may include a bus bar body 141 and a bus bar terminal 143. The bus bar body 141 may be embodied as a ring-shaped mold member. The bus bar terminal 143 is connected to an end of the coil 131 lifted from an assembly of the stator 130 or an assembly of the rotor 120.

The bus bar 140 may electrically connect coils 131 wound around the stator 130 or the rotor 120 to be electrically connected to U-, V-, or W-phase power terminals 250.

The motor housing 150 may be formed in a cylindrical shape such that the stator 130 may be coupled to an inner wall thereof. An upper portion of the motor housing 150 may be open and a lower portion thereof may be closed. The lower portion of the motor housing 150 may be provided with a bearing mounting space for accommodating a bearing for supporting the lower portion of the shaft 110.

FIG. 4 is a diagram illustrating a structure of the bus bar 140 of FIG. 1.

The bus bar terminal 143 may be formed as an arc and include a plurality of connection terminals 143a to be coupled to the coil 131. In one embodiment, three bus bar terminals 143 may be provided to electrically connect the coil 131 wound around the stator 130, and each of the three bus bar terminals 143 may be delta-connected.

FIG. 5 is a diagram illustrating a structure of the connector unit 200 of FIG. 1. FIG. 6 is a diagram illustrating an arrangement of the power terminals 250 included in the connector unit 200 of FIG. 1.

Referring to FIGS. 5 and 6, the connector unit 200 may include a connector body 210 disposed on the motor unit 100 and a connector connection part 230 connected to a side of the body of the connector unit 200 to receive power.

The connector body 210 may be provided with the first through hole 211 through which the shaft 110 passes, and a region thereof may be inserted into the motor housing 150. A sealing part may be provided at a side of the connector body 210 to maintain airtight coupling of the connector body 210 with the motor housing 150.

A plurality of power terminals 250 may protrude outward from the connector body 210. In one embodiment, three power terminals 250 may be provided to be each electrically connected to one of the bus bar terminals 143.

The connector connection part 230 is connected to the connector body 210 and may receive external power. In one embodiment, the power terminals 250 protruding outward from the connector body 210 may be provided in a bent shape to pass through the connector body 210 and the connector connection part 230. The shape of the power terminals 250 is not limited and may be variously changed according to the shape of the connector connection part 230 connected to the connector body 210.

FIG. 7 is a diagram illustrating a structure in which the bus bar 140 and the power terminals 250 of FIG. 1 are connected to each other. FIG. 8 is a diagram illustrating a structure of an end portion of the power terminal 250 of FIG. 7.

Referring to FIGS. 7 and 8, bus bar terminals 143 may be inserted into the power terminals 250 to be electrically connected to the power terminals 250.

An end of each of the power terminals 250 may branch into a pair of contact portions 251. Ends of the pair of contact portions 251 are spaced apart from each other, and the bus bar terminal 143 may be inserted into a space between the pair of contact portions 251. A distance d1 between the ends of the pair of contact portions 251 spaced apart from each other may be less than a width of the bus bar terminal 143 and may be elastically deformed when the bus bar terminal 143 is inserted between the pair of contact portions 251.

In one embodiment, the distance d1 between the pair of contact portions 251 increases in a first region A1 starting from a point where the power terminal 250 branches, decreases in a second region A2, and increases again in a third region A3. The pair of contact portions 251 are designed according to a stress analysis result to prevent cracks from occurring due to an expansion force applied when the pair of contact portions 251 are spread apart to be brought into contact with the bus bar terminal 143. As the stress analysis result, damage caused by stress may be minimized by setting, to a curved region, a branch region X1 to which maximum stress is applied.

A section changed from the second region A2 to the third region A3 is in contact with the bus bar terminal 143, and the third region A3 may include a curved portion to facilitate the insertion of the bus bar terminal 143.

The bus bar body 141 may be provided with a plurality of first protrusions 141a to guide the position of the pair of contact portions 251. The first protrusions 141a may be arranged in pairs and protrude upward from the bus bar body 141.

The pairs of first protrusions 141a may be spaced apart from each other, and the bus bar terminal 143 may pass between the first protrusions 141a. The power terminal 250 may be inserted between the first protrusions 141a, and the bus bar terminal 143 passing between the first protrusions 141a may be inserted into the contact portions 251 to be in contact with the contact portions 251.

The first protrusions 141a may not only guide the position of the bus bar terminal 143 but also prevent the separation or movement of the contact portions 251 in contact with the bus bar terminal 143 to maintain an electrically stable contact. A shape of the first protrusions 141a is not limited but may be changed in various shapes to support both sides of the contact portions 251.

FIG. 9 illustrates the bus bar terminal 143 which is coupled to the power terminal in FIG. 7 according to an embodiment.

Referring to FIG. 9, both sides of the bus bar terminal 143 in contact with the contact portions 251 may include a curved portion 143b. The curved portion 143b may be provided to match in shape to a contact side of the contact portion 251 in contact therewith in a curved form.

The curved portion 143b may facilitate the insertion of the contact portion 251 into the bus bar terminal 143 and maintain a stable coupling state by increasing a contact area through shape matching.

FIG. 10 is a diagram illustrating a structure in which the motor housing 150 and the connector unit 200 of FIG. 2 are connected to each other.

Referring to FIG. 10, the connector unit 200, which is a component of the present invention, may be disposed on the motor housing 150. Various components, such as the power terminal 250, a substrate, and a hall-integrated circuit (IC), are disposed on the connector unit 200 and a position thereof should be fixed when the power terminal 250 is combined with the motor unit 100.

In the present invention, in order to fix the position of the connector unit 200, the motor housing 150 may be provided with at least one hole 151a and the connector unit 200 may be provided with at least one second protrusion 231a. The positions of the hole 151a and the second protrusion 231a may respectively intersect those of the connector unit 200 and the motor housing 150, and a description about the formation of the hole 151a in the connector unit 200 and the formation of the second protrusion 231a on the motor housing 150 will be omitted.

A protrusion 151 may be provided on a side of the motor housing 150. The protrusion 151 may extend from an upper portion of the motor housing 150, and the hole 151a may be formed in a region of a center of the protrusion 151. A shape of the hole 151a is not limited but may have the same cross-sectional shape as the second protrusion 231a so that the second protrusion 231a of the connector unit 200 may be inserted into the hole 151a.

The connector connection part 230 may include a first connection portion 231 and a second connection portion 233.

The first connection portion 231 is connected to a side of the connector body 210 and is disposed to face the protrusion 151 when the connector connection part 230 and the motor housing 150 are coupled to each other. In this case, the first connector portion 231 may be provided with the second protrusion 231a, and the second protrusion 231a may be inserted into the hole 151a to fix the position of the connector unit 200.

In one embodiment, the second protrusion 231a may be provided in a cylindrical shape, the upper portion of which is inclined to be easily inserted into the hole 151a.

In addition, the first connector portion 231 may be provided with a rib 231b in a region at the center thereof, and the second protrusion 231a may be disposed on the rib 231b. The rib 231b may be arranged in a specific structure or may be formed by coring a basic structure. The rib 231b may be disposed in a lengthwise direction of the first connection portion 231 to resist bending or warping of the first connection portion 231.

A plurality of grooves 231c may be provided at both sides of the second protrusion 231a of the first connection portion 231. In one embodiment, the plurality of grooves 231c may be arranged at regular intervals and in a direction perpendicular to a direction of the rib 231b.

The second connection portion 233 may be connected to the first connection portion 231 to receive external power. In one embodiment, the second connection portion 233 may be connected at a certain angle to the first connection portion 231. An angle at which the second connection portion 233 and the first connection portion 231 are connected to each other may be modified according to an angle at which the second connection portion 233 is installed to receive power.

FIG. 11 is a diagram illustrating a first suction port 320 and a first discharge port 330 formed in the first cover 300 of FIG. 2. FIG. 12 is a diagram illustrating a second suction port 520 and a second discharge port 530 formed in the second cover 500 of FIG. 2. FIG. 13 is a diagram illustrating a structure of the pump unit 400 of FIG. 2. FIG. 14 is a diagram illustrating a state in which the pump unit 400 is positioned in the first cover 300. FIG. 15 is a diagram illustrating the pump unit 400 is positioned in the second cover 500.

Referring to FIGS. 11 to 15, the pump unit 400 may be disposed between the first cover 300 and the second cover 500.

The pump unit 400 is inserted into a space, to which a fluid is supplied, between the second cover 500 and the first cover 300 and pumps oil by receiving power from the motor unit 100. The first cover 300 and the second cover 500 are combined together to form a space in which the pump unit 400 is located. The first cover 300 and the second cover 500 are described separately according to functional characteristics but may be connected integrally to each other.

One side of the first cover 300 may be in contact with the connector unit 200 and the other side thereof may include a first side 310 for accommodating the pump unit 400.

The first side 310 may include the first suction port 320 and the first discharge port 330. The first suction port 320 and the first discharge port 330 may each have a conventional port shape.

The second cover 500 may include a second side 510 on which the pump unit 400 is disposed, and the second side 510 may include the second suction port 520 and the second discharge port 530. The second suction port 520 may include an inlet 521, which communicates with the second suction port 520 and through which oil is introduced, and an outlet 531 which communicates with the second discharge port 530.

The second suction port 520 and the second discharge port 530 may be formed in an arc shape and provided to be tapered from one side to the other side. In addition, the second suction port 520 and the second discharge port 530 may be arranged such that a wider portion of the second suction port 520 faces a wider portion of the second discharge port 530 and a narrower portion of the second suction port 520 faces a narrower portion of the second discharge port 530.

The second discharge port 530 may have a conventional port shape.

The second suction port 520 may include a third protrusion 523 protruding inward. The third protrusion 523 may protrude toward a space forming the second suction port 520 from an end of the second suction port 520 farther from the center of the first rotor 410 among ends of the second suction port 520.

The suction port and discharge port are formed respectively on the first cover 300 and the second cover 500 to guide a fluid to be smoothly suctioned and discharged by the pump unit 400. These suction port and discharge ports are arranged by partitioning a space. This is to prevent movement of the fluid due to a pressure difference.

Referring to FIG. 13, the pump unit 400 is disposed between the first cover 300 and the second cover 500 and pumps a fluid by receiving power from the motor unit 100. The pump unit 400 may include the first rotor 410 and the second rotor 120. The first rotor 410 may be referred to as an inner rotor 120 and the second rotor 430 may be referred to as an outer rotor 120.

A turning force is directly applied to the first rotor 410 from the motor unit 100 because the shaft 110 is coupled to a central portion of the first rotor 410. In one embodiment, the shaft 110 includes at least one cut surface 111 and may be inserted into a third coupling hole 440 formed in the center of the first rotor 410. The third coupling hole 440 may match in shape with the shaft 110 to which the third coupling hole 440 is inserted, thereby preventing the first rotor 410 from running idle during rotation of the shaft 110.

The second rotor 430 is disposed outside the first rotor 410. In addition, in the first rotor 410, a first lobe 411 with N gear teeth facing outward in a radial direction with respect to the center of rotation may be provided in a circumferential direction. The second rotor 430 may be provided with N+1 second lobes 431 facing inward in the radial direction. In this case, the second lobe 431 may be disposed to be caught by the first lobe 411. As the first rotor 410 rotates, the second rotor 430 rotates in connection with the first rotor 410.

Meanwhile, a diameter of a dedendum circle C1 of the first rotor 410 (hereinafter referred to as "D1") and a diameter of a dedendum circle C2 of the second rotor 430 (hereinafter referred to as "D2") are criteria for forming a space for pumping oil.

In the present invention, oil may be stably supplied in high-speed regions by changing the shape of a suction port.

FIG. 14 illustrates a contact structure between the first suction port 320 and the first discharge port 330 which are formed on the first cover 300, similarly to a structure of the related art.

However, when the first cover 300 and the second cover 500 are combined together, the first suction port 320 and the second suction port 520 face each other and the first discharge port 330 and the second discharge port 530 face each other. In this case, the first suction port 320 and the second suction port 520 may be arranged in different shapes.

Referring to FIG. 15, the first rotor 410 and the second rotor 430 may be disposed such that the centers thereof do not coincide with each other. When a center P1 of the first rotor 410 and a center P2 of the second rotor 430 are projected onto the second cover 500, an angle formed by a first line L1 connecting the center P1 of the first rotor 410 and the center P2 of the second rotor 430 and a second line L2 connecting the center P1 of the first rotor 410 and an end of the third protrusion 523 may be inversely proportional to the number of gear teeth. A flow rate and velocity of a fluid to be introduced may be determined by an arrangement position of the third protrusion 523.

In one embodiment, an angle θ formed by the first line L1 and the second line L2 may be calculated by Equation 1 below.

$$\theta = \frac{360W}{N*2} \qquad \text{[Equation 1]}$$

Here, N represents the number of gear teeth formed on the first rotor 410.

The position of the end of the third protrusion 523 may be determined according to the angle θ formed by the first line L1 and the second line L2.

In one embodiment, when the first rotor 410 includes five gear teeth as illustrated in FIG. 13, θ may be set to 36 degrees.

In this case, θ may be changed within a range of 5%.

A third line L3 connecting ends of the second suction port 520 in a region adjacent to the third protrusion 523 may be parallel to the first line L1. Two recessed regions are formed at ends of the second suction port 520 due to the third protrusion 523 formed inside the second suction port 520, and the third line L3 connects innermost sides of the two recessed regions.

In addition, when the first line L1 and the third line L3 are parallel to each other, a distance d2 between the first line L1 and the third line L3 is proportional to a distance between the center P1 of the first rotor 410 and the center P2 of the second rotor 430.

In one embodiment, the distance d2 between the first line L1 and the third line L3 may be calculated by Equation 2 below.

$$e*1.25<d2<e*1.35 \qquad \text{[Equation 2]}$$

Here, e represents the distance between the center P1 of the first rotor 410 and the center P2 of the second rotor 430.

Therefore, the arrangement position of the third protrusion 523 of the second suction port 520 may be determined by the number N of gear teeth of the first rotor 410 and a distance e between the center P1 of the first rotor 410 and the center P2 of the second rotor 430.

FIG. 16 is a diagram showing a change in flow rate performance when the shape of the second cover of FIG. 15 is applied.

Referring to FIG. 16, in the related art, an increase in flow rate decreased when the speed of rotation was 4000 rpm or more and decreased greatly when the speed of rotation exceeded 5000 rpm.

However, when the shape of the second cover 500 according to an embodiment of the present invention was applied, a constant flow rate increase was secured even when the speed of rotation exceeded 4000 rpm and was continuously maintained even when the speed of rotation exceeded 5000 rpm.

FIG. 17 is a longitudinal sectional view of a motor according to the embodiment. FIG. 18 is a cross sectional view taken along line A-A of FIG. 17.

Referring to FIGS. 17 and 18, a motor 1001 according to an embodiment may include a housing 1100, a bracket 1200, a rotor 1300, a stator 1400, and a shaft 1500. Here, the bracket 1200 may be disposed to cover an open upper portion of the housing 1100.

The housing 1100 and the bracket 1200 may form an exterior of the motor 1001. Here, the housing 1100 may be formed in a cylindrical shape having an opening thereon.

Therefore, an accommodation space may be formed in the motor 1101 due to coupling of the housing 1100 and the bracket 1200. As illustrated in FIG. 17, the rotor 1300, the stator 1400, the shaft 1500, and the like may be disposed in the accommodation space.

The housing 1100 may be formed in a cylindrical shape so that the stator 1400 may be supported on an inner circumferential surface of the housing 1100. A pocket portion for accommodation of a bearing 1060 supporting a lower portion of the shaft 1500 may be provided at the bottom of the housing 1100.

The bracket 1200 disposed on the top of the housing 1100 may also be provided with a pocket portion for supporting an upper portion of the shaft 1500. The bracket 1200 may include a hole or a groove into which a connector, to which an external cable is connected, is inserted.

The rotor 1300 is disposed inside the stator 1400. Here, an inner side with respect to a radial direction (a y-axis direction) refers to a direction toward a center CC with respect to the center CC, and an outer side refers to a direction opposite that of the inner side. The center CC is the center of rotation of the shaft 1500 and may be a center CC of the rotor 1300.

The rotor 1300 may include a rotor core 1310 and a magnet 1320.

Here, the rotor 1300 may be an interior permanent magnet (IPM) type rotor in which the magnet 1320 is coupled to the inside of the rotor core 1310. Accordingly, the rotor 1300 may include a pocket into which the magnet 1320 is inserted.

FIG. 19 is a diagram illustrating a rotor core of a motor according to an embodiment.

Referring to FIG. 19, a rotor core 1310 may include a main body 1311, a pocket 1312, a first barrier 1313, a second barrier 1314, and a hole 1315.

The main body 1311 forms an exterior of the rotor core 1310.

Here, the main body 1311 may be formed by stacking a plurality of thin steel plates together.

A magnet 1320 is disposed in the pocket 1312.

As illustrated in FIG. 19, a plurality of pockets 1312 may be formed to be spaced apart from each other in a circumferential direction with respect to a center CC of the rotor core 1310. Accordingly, magnets 1320 may be disposed in the circumferential direction with respect to the center CC of the rotor core 1310. In this case, the magnets 1320 may be inserted into the pockets 1312.

The first barrier 1313 may extend from both sides of the pocket 1312. As illustrated in FIG. 18, when the magnets 1320 are disposed in the pockets 1312, the first barriers 1313 may be disposed at both sides of the magnets 1320.

An air layer may be formed on the first barrier 1313. Accordingly, the first barrier 1313 serves as a flux barrier to prevent a short circuit and a leakage of magnetic flux.

However, when only the first barrier 1313 is disposed on the main body 1311 without the second barrier 1314, the magnet 1320 may not be fully magnetized when the magnet 1320 is magnetized using only a certain amount of a current. Here, the magnetization refers to applying, to a magnet, an external magnetic field about 3 to 4 times a coercive force of the magnet. In this case, a high current is used to generate the external magnetic field. In particular, when the magnet is an NdFeB-based rare earth magnet, a peak value of a magnetizing field is determined by saturation magnetic flux density.

When a certain current is applied, the second barrier 1314 adjusts magnetic flux saturation of the main body 1311 so that a maximum H field may be present in the magnet 1320. Accordingly, the magnet 1320 may be fully magnetized.

FIG. 20 is a diagram illustrating region B of FIG. 18, and the region B is part of the rotor 1300.

Referring to FIGS. 18 and 20, a plurality of second barriers 1314 may be arranged in the circumferential direction. For example, two second barriers 1314 may be arranged adjacent to one magnet 1320. Here, the arrangement of the two second barriers 1314 adjacent to one magnet 1320 may be understood to mean that the second barriers 1314 are arranged such that outer circumferential surfaces thereof are spaced a certain distance from the magnet 1320.

The second barriers 1314 may be formed between an inner circumferential surface 311a and an outer circumferential surface 311b of the main body 1311. As illustrated in FIG. 20, the second barriers 1314 may be formed between the inner circumferential surface 311a of the main body 1311 and an inner side 321 of the magnet 1320.

The second barrier 1314 may be formed to have a circular cross section having a certain radius R. That is, a size of the second barrier 1314 may be defined by the radius R. Here, an example in which the second barrier 1314 has a circular cross section has been described above but embodiments are not limited thereto. As illustrated in FIG. 21, the second barrier 1314 may be provided as a polygonal shape, such as a hemispherical shape, an ellipse shape, a tetragonal shape or a hexagonal shape, or a bent tetragonal shape in consideration of an arrangement position of the second barrier 1314.

The second barriers 1314 may be disposed to be symmetric to each other with respect to a first line L11. As illustrated in FIG. 20, two second barriers 1314 disposed to correspond to one magnet 1320 may be symmetric to each other with respect to the first line L11. Here, the first line L11 is a line passing through the center CC of the main body 1311 and the center of a width W of the magnet.

The arrangement position of the second barrier 1314 may be defined by an arrangement angle θ and an arrangement distance D33 from the center CC of the rotor core 1310.

A center C11 of the second barrier 1314 may have a certain arrangement angle θ with respect to the first line L11 in the circumferential direction. For example, the arrangement angle θ may be an angle formed by the first line L11 and a second line L22 passing through the center CC of the main body 1311 and the center C11 of the second barrier 1314. In this case, an included angle between the first line L11 and the second line L22 is an angle with respect to the center CC.

In this case, the inner side 1321 of the magnet 1320 may be disposed on the second line L22 passing through the center CC of the main body 1311 and the center C11 of the second barrier 1314. As illustrated in FIG. 20, one point P1 on the outer circumferential surface of the second barrier 1314 and one point P2 on the inner side 321 of the magnet 1320 may be disposed on the second line L22.

The arrangement angle θ may be calculated by Equation 3 below.

$$\arctan\left(\frac{W/2}{D11}\right) \le \theta \le \arctan\left(\frac{W/2}{D22}\right) \quad \text{[Equation 3]}$$

As illustrated in FIG. 20, W represents a width of a magnet, D11 represents the distance from the center of a main body to an inner side surface of the magnet, and D22 represents the distance from the center of the main body to an outer side surface of the magnet.

For example, when the rotor 1300, which is an IPM type, is designed, the arrangement angle θ is less than 25.3 degrees and greater than 20.7 degrees when W is 9.8 mm, D11 is 10.375 mm, and D22 is 12.95 mm. Accordingly, the arrangement angle θ of the second barrier 1314 may be designed to be an angle between 20.7 degrees and 25.3 degrees.

The arrangement distance D33 may be calculated by Equation 4 below. Here, the arrangement distance D33 is a distance from the center CC of the main body 1311 to the center of the second barrier 1314.

$$D33 = \frac{D11}{\cos\theta} - O - R \quad \text{[Equation 4]}$$

As illustrated in FIG. 20, O represents the distance between one point P1 on the outer circumferential surface of the second barrier 1314 and one point P2 on the inner side 321 of the magnet 1320, which are located on the second line L22.

As described above, when the arrangement angle θ is set to 22 degrees to be within a range of the arrangement angle θ, R is set to 0.5 mm, and O is set to 0.2 mm, which are design parameters, the arrangement distance D33 is determined to be 10.5 mm according to Equation 4 above.

Therefore, the arrangement position of the second barrier 1314 is determined by the placement angle θ of 22 degrees and the placement distance D33 of 10.5 mm.

When the arrangement angle θ is set to 21.5 degrees to be within the range of the arrangement angle θ and design parameters R and O are respectively set to 1.0 mm and 0.4 mm, the arrangement distance D33 is determined to be 9.75 mm according to Equation 4 above.

Therefore, the arrangement position of the second barrier 1314 is determined by the placement angle θ of 21.5 degrees and the placement distance D33 of 9.75 mm.

The second barrier 1314 may be formed to be long from an upper end of the main body 1311 to a lower end of the main body 1311. However, the present invention is not limited thereto, and a length of the second barrier 1314 in an axial direction (an x-axis direction) may be the same as a length of the magnet 1320 in the axial direction (the x-axis direction). Here, an air layer may be formed on the second barrier 1314.

The hole 1315 may be formed in a central portion of the body 315. Accordingly, the shaft 1500 may be coupled to the hole 1315.

The magnet 1320 may be provided in the form of a tetragonal pillar extending from the upper end of the rotor core 1310 to the lower end of the rotor core 1310. An example in which six magnets 1320 are disposed in the motor 1001 has been described above, but the embodiments are not limited thereto.

In this case, the magnitude of an external magnetic field required to magnetize the magnets 1320 varies according to energy density, coercive force, saturation magnetic flux density, etc. of a material of the magnets 1320.

FIG. 22 is a diagram showing a comparison of an H field with respect to a rotor of a motor according to an example with an H field with respect to a rotor of a motor according to a comparative example. FIG. 22A is a diagram illustrating the H field of the motor according to the example, and FIG. 22B is a diagram illustrating the H field of the motor according to the comparative example. Here, a motor 1002 provided as the comparative example is different from the motor 1001 in terms of the presence of and an arrangement position of the second barrier 314.

Referring to FIG. 22, when a magnetization peak current of 10.26 kA is supplied to the motor 1001 and the motor 1002 of the comparative example, an H field of the magnet 1320 of the motor 1001 is 1.8734*10⁶ A/m and an H field of the motor 1002 of the comparative example is 1.6465*10⁶ A/m. In this case, the radius R of the second barrier 1314 is 1.0 mm.

That is, in the case of the motor 1001, a magnitude of the H field is increased by about 13.8% due to the second barrier 1314. Accordingly, a magnetizing current of the motor 1001 may be reduced from 10.26 kA to 8.84 kA. That is, the motor 1002 of the comparative example to which 10.26 kA is applied and the motor 1001 to which 8.84 kA is applied have the same magnetization performance.

Therefore, the lowest H field of the motor 1001 with the second barrier 1314 increases and thus magnetization power of the motor 1001 is improved compared to the motor 1002 of the comparative example. In addition, a local non-magnetized region of the magnet 1320 decreases.

Meanwhile, the H field may be adjusted by the radius R of the second barrier 1314. That is, as the radius R of the second barrier 1314 is adjusted, the arrangement distance D3 is adjusted and thus a magnetization performance difference occurs.

When the radius R of the second barrier 1314 is adjusted to 0.5 mm and a magnetizing peak current of 10.26 kA is supplied to the motor 1001 and the motor 1002 of the comparative example, an H field of the magnet 1320 of the motor 1001 is 1.8288*10⁶ A/m and an H field of the motor 1002 of the comparative example is 1.6465*10⁶ A/m.

That is, in the case of the motor 1001, the magnitude of the H field is improved by about 11.1% due to the second barrier 1314.

Accordingly, the second barrier 1314 of the motor 1001 may increase the magnitude of a magnetization field in the magnet 1320, thereby increasing a magnetization feature of the magnet 1320. In addition, the arrangement distance D3 is adjusted by the radius R of the second barrier 1314.

FIG. 23 is a diagram showing a comparison of a uniform magnetic flux line of a rotor of a motor according to an example with a uniform magnetic flux line of a rotor of a motor according to a comparative example. FIG. 23A is a diagram illustrating the uniform magnetic flux line of the motor of the example, and FIG. 23B is a diagram illustrating the uniform magnetic flux line of the motor of the comparative example.

Referring to FIG. 23, a second barrier 1314 of a motor 1001 causes a change in magnetic resistance to change a magnetic flux path. In particular, the second barrier 1314 with an air layer has low permeability and thus a magnetic flux path in the rotor core 1310 may be greatly changed. Accordingly, a magnetic flux is concentrated at an inner edge of the magnet 1320 and thus the motor 1001 has a higher magnetic flux density distribution than the motor 1002 of the comparative example.

FIG. 24 is a diagram showing a comparison of magnetic flux density of a rotor of a motor according to an example with magnetic flux density of a rotor of a motor according to a comparative example. FIG. 24A is a diagram illustrating an H field of the motor of the example, and FIG. 24B is a diagram illustrating an H field of the motor of comparative example.

Referring to FIG. 24, the lowest magnetic flux density of the motor 1001 is higher than that of the motor 1002 of the comparative example. Accordingly, a magnitude of an external magnetic field applied to an inner corner of the magnet 1320 increases.

The stator 1400 may be supported by the inner circumferential surface of the housing 1100. The stator 1400 is disposed outside the rotor 1300. That is, the rotor 1300 may be disposed on an inner side of the stator 1400.

Referring to FIGS. 17 and 18, the stator 1400 may include a stator core 1410 and a coil 1420. Here, the stator core 1410 may be formed by stacking a plurality of thin steel plates together. Alternatively, the stator core 1410 may be formed by coupling or connecting a plurality of split cores to each other.

The stator core 1410 may include a yoke 1411 and teeth 1412.

The yoke 1411 may be formed in a cylindrical shape.

The teeth 1412 may be disposed to protrude from the yoke 1411 toward the center CC. As illustrated in FIG. 20, the teeth 1412 may be disposed at regular intervals along an inner circumferential surface of the yoke 1411 to protrude toward the center CC. That is, the teeth 1412 may be disposed along the inner circumferential surface of the yoke 1411 to be spaced a certain distance from each other.

A coil 1420 may be wound around the teeth 1412. In this case, an insulator 1430 may be disposed on the tooth 1412. The insulator 1430 insulates the teeth 1412 and the coil 1420 from each other.

A current may be applied to the coil 1420. Accordingly, electrical interaction with the magnet 1320 of the rotor 1300 may be caused to rotate the rotor 1300. When the rotor 1300 rotates, the shaft 1500 also rotates. In this case, the shaft 1500 may be supported by the bearing 1060.

The shaft 1500 may be coupled to the rotor 1300. When electromagnetic interaction occurs between the rotor 1300 and the stator 1400 through the supply of current, the rotor 1300 rotates and the rotation shaft 1500 rotates in association with the rotor 1300.

Meanwhile, the motor 1001 may further include a sensing magnet assembly 1600 to identify the position of the rotor 1300.

The sensing magnet assembly 1600 may include a sensing magnet and a sensing plate. The sensing magnet and the sensing plate can be combined to have the same axis.

The sensing magnet may include a main magnet disposed in a circumferential direction to be adjacent to a hole forming an inner circumferential surface thereof, and a sub-magnet formed at an edge thereof. The main magnet may be arranged in the same manner as a drive magnet inserted into the rotor 1300 of the motor 1001. The sub-magnet is subdivided to have a larger number of poles than the main magnet. Therefore, a rotation angle may be more subdivided and measured, and the motor 1001 may be more smoothly driven.

The sensing plate may be formed of a disc type metal material. An upper side of the sensing plate may be coupled to the sensing magnet. In addition, the sensing plate may be coupled to the shaft 1500. Here, the sensing plate is provided with a hole through which the shaft 1500 passes.

In addition, the motor 1001 may further include a printed circuit board 1700 on which a sensor is disposed to sense a magnetic force of the sensing magnet.

In this case, the sensor may be a Hall IC. The sensor senses a change of N and S poles of the main magnet or the sub-magnet to generate a sensing signal. In the case of a three-phase brushless motor, at least three sensing signals are required to obtain information about U-, V-, and W-phases and thus at least three sensors may be arranged.

The printed circuit board 1700 may be coupled to a bottom surface of the bracket 1200 and installed on the sensing magnet assembly 1600 such that the sensor faces the sensing magnet.

Embodiments of the present invention have been described above in detail with reference to the accompanying drawings.

While the technical idea of the present invention has been described above with respect to examples thereof, it will be apparent to those of ordinary skill in the art that various modifications, changes and alternatives may be made without departing from the essential features of the invention. Therefore, the embodiments disclosed herein and the accompanying drawings are not intended to restrict the scope of the present invention and are only used for a better understanding of the present invention. The scope of the present invention is not limited by these embodiments and the accompanying drawings. The scope of protection of the present invention should be interpreted based on the following claims, and all technical ideas within a scope equivalent thereto should be construed as falling within the scope of the present invention.

DESCRIPTION OF REFERENCE NUMERALS

1: electric pump, 100: motor unit, 110: shaft, 111: cut surface, 120: rotor, 130: stator, 131: coil, 140: bus bar, 141: bus bar body, 141a: first protrusion, 143: bus bar terminal, 143a: connection terminal, 143b: curved portion, 150: motor housing, 151: protrusion, 151a: hole, 200: connector unit, 210: connector body, 211: first through hole, 230: connector connection part, 231: first connection portion, 231a: second protrusion, 231b: rib, 231c: groove, 233: second connection portion, 250: power terminal, 251: contact portion, 300: first cover, 310: first surface, 320: first suction port, 330: first discharge port, 340: second through hole, 400: pump unit, 410: first rotor, 411: first lobe, 430: second rotor, 431: second lobe, 440: third coupling hole, 500: second cover, 510: second surface, 520: second suction port, 521: inlet, 523: third protrusion, 530: second discharge port, 531: outlet, 1001: motor, 1060: bearing, 1100: housing, 1200: bracket, 1300: rotor, 1310: rotor core, 1311: main body, 1312: pocket, 1313: first barrier, 1314: second barrier, 1315: hole,

1320: magnet, 1400: stator, 1410: stator core, 1411: yoke, 1412: tooth, 1420: coil, 1500: shaft, 1600: sensing magnet assembly, 1700: printed circuit board

The invention claimed is:

1. A motor comprising:
a shaft;
a rotor including a hole in which the shaft is disposed; and
a stator outside the rotor,
wherein the rotor comprises a rotor core and a magnet,
wherein the rotor core comprises:
   a main body;
   a pocket which is formed in the main body and in which the magnet is disposed;
   first barriers extending from both sides of the pocket; and
   second barriers formed between an inner circumferential surface of the main body and an outer circumferential surface of the main body,
wherein a center (C11) of the second barrier has a certain arrangement angle (θ) in a circumferential direction from a first line (L11) passing through a center (CC) of the main body and a center of a width (W) of the magnet,
wherein the arrangement angle (θ) is calculated by the following equation:

$$\arctan\left(\frac{W/2}{D11}\right) \le \theta \le \arctan\left(\frac{W/2}{D22}\right),$$

wherein W represents a width of the magnet, D11 represents a distance from the center of the main body to an inner side surface of the magnet, and D22 represents a distance from the center of the main body to an outer side surface of the magnet.

2. The motor of claim 1, wherein the second barrier is formed to be long from an upper end of the main body to a lower end of the main body.

3. The motor of claim 1, wherein two of the second barriers disposed to correspond to one magnet are symmetrical with respect to the first line (L11).

4. The motor of claim 1, wherein the second barrier has a certain radius (R).

5. The motor of claim 4, wherein the inner side surface of the magnet is disposed on a second line (L22) passing through the center (CC) of the main body and the center (C11) of the second barrier.

6. The motor of claim 5, wherein an arrangement distance (D33) from the center (CC) of the main body to the center (C11) of the second barrier is calculated by the following equation:

$$D3 = \frac{D1}{\cos\theta} - O - R,$$

wherein O represents a distance between one point (P1) on an outer circumferential surface of the second barrier disposed on the second line (L22) and one point P2 on the inner side surface of the magnet.

7. A motor comprising:
a rotor including a hole in which a shaft is to be disposed; and
a stator outside the rotor,
wherein the rotor comprises a rotor core and a plurality of magnets,
wherein the rotor core includes:
   a body;
   a plurality of pockets disposed at the body configured to receive the plurality of magnets;
   a plurality of first barriers, and a first one of the first barriers to extend from a first one of the pockets that receives a first one of the magnets, and a second one of the first barriers to extend from the first one of the pockets; and
   a plurality of second barriers formed on the body, a first one of the second barriers having a radius of a circular shape,
wherein a center of the first one of the second barriers has a specific arrangement angle (θ) in a circumferential direction from a first line passing through a center of the body and a center of a width (W) of the first one of the magnets,
wherein the specific arrangement angle (θ) is determined by the following equation:

$$\arctan\left(\frac{W/2}{D11}\right) \le \theta \le \arctan\left(\frac{W/2}{D22}\right),$$

wherein W represents a width of the first one of the magnets, D11 represents a minimum distance from the center of the body to an inner side surface of the first one of the magnets, and D22 represents a minimum distance from the center of the body to an outer side surface of the first one of the magnets.

8. The motor of claim 7, wherein the inner side surface of the first one of the magnets is disposed on a second line passing through the center of the body and the center of the first one of the second barriers.

9. The motor of claim 8, wherein an arrangement distance from the center of the body to the center of the first one of the second barriers is determined by the following equation:

$$D3 = \frac{D1}{\cos\theta} - O - R,$$

wherein O represents a distance between one point on an outer circumferential surface of the first one of the second barriers disposed on the second line and one point on the inner side surface of the first one of the magnets.

10. The motor of claim 7, wherein the first one of the second barriers is formed to be long from an upper end of the body to a lower end of the body.

11. The motor of claim 7, wherein two of the second barriers disposed to correspond to the first one of the magnets are symmetrical with respect to the first line.

* * * * *